US011958288B2

(12) United States Patent
Pomerantz et al.

(10) Patent No.: US 11,958,288 B2
(45) **Date of Patent: *Apr. 16, 2024**

(54) DIGITAL PRINTING SYSTEM

(71) Applicant: LANDA CORPORATION LTD., Rehovot (IL)

(72) Inventors: Uriel Pomerantz, Kfar Saba (IL); Vitaly Burkatovsky, Rishon Lezion (IL)

(73) Assignee: LANDA CORPORATION LTD., Rehovot (IL)

( * ) Notice: Subject to any disclaimer, the term of this patent is extended or adjusted under 35 U.S.C. 154(b) by 0 days.

This patent is subject to a terminal disclaimer.

(21) Appl. No.: 18/137,488

(22) Filed: Apr. 21, 2023

(65) Prior Publication Data

US 2023/0364904 A1 Nov. 16, 2023

Related U.S. Application Data

(63) Continuation of application No. 17/583,372, filed on Jan. 25, 2022, now Pat. No. 11,660,856, which is a continuation of application No. 16/764,330, filed as application No. PCT/IB2018/059032 on Nov. 16, 2018, now Pat. No. 11,267,239.

(60) Provisional application No. 62/595,536, filed on Dec. 6, 2017, provisional application No. 62/588,405, filed on Nov. 19, 2017.

(51) Int. Cl.
*B41J 2/005* (2006.01)
*B41J 11/00* (2006.01)
*B41J 2/01* (2006.01)

(52) U.S. Cl.
CPC ......... *B41J 2/0057* (2013.01); *B41J 11/0015* (2013.01); *B41J 2002/012* (2013.01)

(58) Field of Classification Search
None
See application file for complete search history.

(56) References Cited

U.S. PATENT DOCUMENTS 11,660,856 B2 5/2023 Pomerantz et al.

FOREIGN PATENT DOCUMENTS

JP 2009082835 A 4/2009
JP 2012150390 A 8/2012

OTHER PUBLICATIONS

JP2009082835A Machine Translation (by EPO and Google)—published Apr. 23, 2009; Fujifilm Corp.
JP2012150390A Machine Translation (by EPO and Google)—published Aug. 9, 2012; Konica Minolta Business Tech.

*Primary Examiner* — Justin Seo
(74) *Attorney, Agent, or Firm* — Momentum IP; Marc Van Dyke

(57) ABSTRACT

A printing system comprises an intermediate transfer member (ITM), an image forming station, a conveyer for driving rotation of the ITM, and a treatment station disposed downstream of the impression station and upstream of the image forming station configured for coating the ITM surface with a layer of a liquid treatment formulation, the treatment station comprising an applicator for applying the liquid treatment formulation to the ITM, a coating thickness-regulation assembly comprising a plurality of blades, a blade-replacement mechanism, and a blade-replacement controller for controlling the blade-replacement mechanism.

19 Claims, 22 Drawing Sheets

ALTERNATIVE EMBODIMENT

DIGITAL PRINTING SYSTEM

CROSS-REFERENCE TO RELATED APPLICATIONS

This patent application is a continuation of U.S. application Ser. No. 17/583,372 filed on Jan. 25, 2022, which is incorporated herein by reference in its entirety, U.S. application Ser. No. 17/583,372 is a continuation of U.S. application Ser. No. 16/764,330 which is a national-stage entry of PCT/IB2018/059032 which was filed on Nov. 16, 2018 and which is incorporated herein by reference in its entirety. PCT/IB2018/059032 claims the benefit of U.S. Provisional Patent Application No. 62/588,405 filed on Nov. 19, 2017, and of U.S. Provisional Patent Application No. 62/595,536 filed on Dec. 6, 2017, both of which are incorporated herein by reference in their entirety.

FIELD OF THE INVENTION

The present invention relates to systems and methods for controlling various aspects of a digital printing system that uses an intermediate transfer member. In particular, the present invention is suitable for printing systems in which a liquid formulation is applied to the intermediate transfer member.

BACKGROUND

Various printing devices use an inkjet printing process, in which an ink is jetted to form an image onto the surface of an intermediate transfer member (ITM), which is then used to transfer the image onto a substrate. The ITM may be a rigid drum or a flexible belt (e.g. guided over rollers or mounted onto a rigid drum). Sometimes it can be desirable to apply a liquid solution to the surface of the ITM, for example a treatment solution to improve the quality of the image that is printed onto the surface of the ITM and transferred thence to a substrate. A liquid solution can be applied in excess of the final desired thickness, in which case doctor blades can be used to remove the excess. Such doctor blades have to be cleaned from time to time, to assure proper and continuous application of the liquid solution during the operation of the printing press. In order to facilitate the cleaning of the blades it can be advantageous to replace the blades from time to time, but preferably only in accordance with instructions carried out by a blade-replacement controller.

The following co-pending patent publications provide potentially relevant background material, and are all incorporated herein by reference in their entirety: WO/2017/009722 (publication of PCT/IB2016/053049 filed May 25, 2016), WO/2016/166690 (publication of PCT/IB2016/052120 filed Apr. 4, 2016), WO/2016/151462 (publication of PCT/IB2016/051560 filed Mar. 20, 2016), WO/2016/113698 (publication of PCT/IB2016/050170 filed Jan. 14, 2016), WO/2015/110988 (publication of PCT/IB2015/050501 filed Jan. 22, 2015), WO/2015/036812 (publication of PCT/IB2013/002571 filed Sep. 12, 2013), WO/2015/036864 (publication of PCT/IB2014/002366 filed Sep. 11, 2014), WO/2015/036865 (publication of PCT/IB2014/002395 filed Sep. 11, 2014), WO/2015/036906 (publication of PCT/IB2014/064277 filed Sep. 12, 2014), WO/2013/136220 (publication of PCT/IB2013/051719 filed Mar. 5, 2013), WO/2013/132419 (publication of PCT/IB2013/051717 filed Mar. 5, 2013), WO/2013/132424 (publication of PCT/IB2013/051727 filed Mar. 5, 2013), WO/2013/132420 (publication of PCT/IB2013/051718 filed Mar. 5, 2013), WO/2013/132439 (publication of PCT/IB2013/051755 filed Mar. 5, 2013), WO/2013/132438 (publication of PCT/IB2013/051751 filed Mar. 5, 2013), WO/2013/132418 (publication of PCT/IB2013/051716 filed Mar. 5, 2013), WO/2013/132356 (publication of PCT/IB2013/050245 filed Jan. 10, 2013), WO/2013/132345 (publication of PCT/IB2013/000840 filed Mar. 5, 2013), WO/2013/132339 (publication of PCT/IB2013/000757 filed Mar. 5, 2013), WO/2013/132343 (publication of PCT/IB2013/000822 filed Mar. 5, 2013), WO/2013/132340 (publication of PCT/IB2013/000782 filed Mar. 5, 2013), and WO/2013/132432 (publication of PCT/IB2013/051743 filed Mar. 5, 2013).

SUMMARY

The following co-pending applications are all incorporated herein by reference in their entirety: PCT application PCT/IB2017/053177, filed May 30, 2017, and PCT application PCT/IL2017/050616, filed Jun. 1, 2017.

The present disclosure relates to printing systems and methods of operating printing systems, for example, a digital printing system having a moving intermediate transfer member (ITM) such as, for example, a flexible ITM (e.g. a blanket) mounted over a plurality of rollers (e.g. a belt) or mounted over a rigid drum (e.g. a drum-mounted blanket).

An ink image is formed on a surface of the moving ITM (e.g. by droplet deposition at an image-forming station) and subsequently transferred to a substrate, which can comprise a paper, a plastic, a metal, or any other suitable material. To transfer the ink image to the substrate, substrate is pressed between at least one impression cylinder and a region of the moving ITM where the ink image is located, at which time the transfer station (also called an impression station) is said to be engaged.

For flexible ITMs mounted over a plurality of rollers, an impression station typically comprises, in addition to the impression cylinder, a pressure cylinder or roller, the outer surface of which may optionally be compressible. The flexible blanket or belt passes in between such two cylinders which can be selectively engaged or disengaged, typically when the distance between the two is reduced or increased. One of the two cylinders may be at a fixed location in space, the other one moving toward or apart of it (e.g. the pressure cylinder is movable or the impression cylinder is movable) or the two cylinders may each move toward or apart from the other. For rigid ITMs, the drum (upon which a blanket may optionally be mounted) constitutes the second cylinder engaging or disengaging from the impression cylinder.

For the sake of clarity, the word rotation is used herein to denote the movement of an ITM in a printing press in a print direction, regardless of whether the movement is at various places in the printing press locally linear or locally rotational or otherwise. For rigid ITMs having a drum shape or support, the motion of the ITM is rotational. The print direction is defined by the movement of an ink image from an image forming station to an impression station. Unless the context clearly indicates otherwise, the terms upstream and downstream as may be used hereinafter relate to positions relative to the printing direction.

Some embodiments relate to printing systems, and in particular printing systems that comprise an intermediate transfer member (ITM) comprising a flexible endless belt mounted over a plurality of guide rollers, and also comprising first and second pluralities of pre-determined sections, an image forming station configured to form ink images upon a surface of the ITM, a conveyer for driving rotation of the ITM to transport the ink images towards an impression station where they are transferred to substrate, and a treatment station disposed downstream of the impression station and upstream of the image forming station configured for coating the ITM surface with a layer of a liquid treatment formulation, wherein the treatment station can comprise an applicator for applying the liquid treatment formulation to the ITM, a coating thickness-regulation assembly comprising a plurality of blades, the assembly configured so that for at least a part of the time each one of the blades is in an active position for removing excess liquid from a section of the ITM as the ITM section traverses a fixed excess-removal location so as to leave only the desired layer of treatment formulation, a blade-replacement mechanism, associated with the coating thickness-regulation assembly and configured for performing blade-replacement operations to replace a blade in the active position with another blade; and a blade-replacement controller for controlling the blade-replacement mechanism to ensure that the blade-replacement operations are performed only when one of the first plurality of pre-determined sections of the ITM traverses the excess-removal location.

In some embodiments, a printing system can comprise an intermediate transfer member (ITM) comprising a flexible endless belt mounted over a plurality of guide rollers (an ITM can comprise first and second pluralities of pre-determined sections), an image forming station configured to form ink images upon a surface of the ITM, a conveyer for driving rotation of the ITM to transport the ink images towards an impression station where they are transferred to substrate, and a treatment station disposed downstream of the impression station and upstream of the image forming station configured for coating the ITM surface with a layer of a liquid treatment formulation, wherein the treatment station can comprise an applicator for applying the liquid treatment formulation to the ITM, a coating thickness-regulation assembly comprising a plurality of blades, the assembly configured so that for at least a part of the time each one of the blades is in an active position for removing excess liquid so as to leave only the desired layer of treatment formulation, a blade-replacement mechanism, associated with the coating thickness-regulation assembly and configured for performing blade-replacement operations to replace a blade in the active position with another blade; and a blade-replacement controller for controlling the blade-replacement mechanism to ensure that the blade-replacement operations are performed only when one of the first plurality of pre-determined sections of the ITM traverses the excess-removal location.

In some embodiments, a printing system can comprise an intermediate transfer member (ITM) comprising a flexible endless belt mounted over a plurality of guide rollers (an ITM can comprise first and second pluralities of pre-determined sections), an image forming station configured to form ink images upon a surface of the ITM, a conveyer for driving rotation of the ITM to transport the ink images towards an impression station where they are transferred to substrate, and a treatment station disposed downstream of the impression station and upstream of the image forming station configured for applying a layer of a liquid treatment formulation on the ITM surface, wherein the treatment station can comprise an applicator for applying the liquid treatment formulation to the ITM, a coating thickness-regulation assembly comprising a plurality of blades (the assembly can be configured so that for at least a part of the time each one of the blades is in an active position for removing excess liquid from a section of the ITM as the ITM section traverses a fixed excess-removal location so as to leave only the desired layer of treatment formulation), a blade-replacement mechanism associated with the coating thickness-regulation assembly and configured for performing blade-replacement operations to replace a blade in the active position with another blade, and a blade-replacement controller for controlling the blade-replacement mechanism to avoid performing blade-replacement operations when one of the second plurality of pre-determined sections of the ITM traverses the excess-removal location.

In some embodiments, a printing system can comprise an intermediate transfer member (ITM) comprising a flexible endless belt mounted over a plurality of guide rollers (an ITM can comprise first and second pluralities of pre-determined sections), an image forming station configured to form ink images upon a surface of the ITM, a conveyer for driving rotation of the ITM to transport the ink images towards an impression station where they are transferred to substrate, and a treatment station disposed downstream of the impression station and upstream of the image forming station configured for applying a layer of a liquid treatment formulation on the ITM surface, wherein the treatment station can comprise an applicator for applying the liquid treatment formulation to the ITM, a coating thickness-regulation assembly comprising a plurality of blades (the assembly can be configured so that for at least a part of the time each one of the blades is in an active position for removing excess liquid from a section of the ITM as the ITM section traverses a fixed excess-removal location so as to leave only the desired layer of treatment formulation), a blade-replacement mechanism associated with the coating thickness-regulation assembly and configured for performing blade-replacement operations to replace a blade in the active position with another blade, and a blade-replacement controller for controlling the blade-replacement in accordance with a timing scheme. The timing scheme can mean that the blade-replacement controller can control the blade-replacement to perform a blade-replacement operation exactly once during each rotation of the ITM.

In embodiments of the printing system, the blade-replacement controller can control the blade-replacement mechanism to perform the blade-replacement operations only when a pre-selected one of the first plurality of pre-determined sections of the ITM traverses the excess-removal location. In some embodiments, the blade-replacement controller can additionally or alternatively control the blade-replacement mechanism to avoid performing blade-replacement operations while ink images are being transferred to a sheet of substrate at the impression station. In some embodiments, the blade-replacement controller may additionally or alternatively control the blade-replacement mechanism in accordance with a timing scheme.

In some embodiments, the printing system can additionally comprise a plurality of input devices configured to communicate with the blade-replacement controller. The blade-replacement controller can control the blade-replacement mechanism according to ITM-panel position information communicated thereto from an input device.

As mentioned above with respect to certain embodiments, an ITM can comprise first and second pluralities of pre-determined sections. The second plurality of pre-determined sections can include sections of the ITM which comprise ink-image areas. The second plurality of pre-determined sections can include a section of the ITM that comprises a seam. In some embodiments, the first and second pluralities are mutually exclusive, and in some embodiments the first and second pluralities together comprise all the sections of the ITM.

In some embodiments, the coating thickness-regulation assembly can comprise a blade-holder, which can be rotatable, and which can be a cylinder or a polygonal cylinder, and which can have the blades arranged so as to be radially extended from the blade-holder. A blade-replacement mechanism according to embodiments can comprise a motor, for example a DC motor or an AC motor. In some embodiments, the blade-replacement operation comprises rotating the coating-thickness-regulation assembly.

In embodiments, the coating thickness-regulation assembly and the blade-replacement mechanism can be configured so that at a first time before a blade-replacement operation, only a first blade is in the active position, at a second time during a blade-replacement operation, the first blade and a second blade are both in the active position, and at a third time after a blade-replacement operation, only the second blade is in the active position.

In some embodiments, the blade-replacement controller can control the blade-replacement to perform a blade-replacement operation exactly once during each rotation of the ITM. In some embodiments, the blade-replacement controller can comprise a non-transitory computer-readable medium containing program instructions, wherein execution of the program instructions by one or more processors of a computer system can cause the one or more processors to carry out at least one of causing the blade-replacement mechanism to perform a blade-replacement operation only when one of the first plurality of pre-determined sections of the ITM traverses the excess-removal location, and causing the blade-replacement mechanism to avoid performing a blade-replacement operation when one of the second plurality of pre-determined sections of the ITM traverses the excess-removal location.

In embodiments, a method of operating a printing system—a printing system wherein ink images are formed upon a surface of a rotating intermediate transfer member (ITM) by droplet deposition, transported towards an impression station and transferred to substrate, and wherein the printing system includes a blade-replacement mechanism and a blade-replacement controller—can comprise applying an excess of liquid treatment formula to a section of the surface of the rotating ITM downstream of the impression station, transporting the section of the ITM with an excess of liquid treatment formulation past an excess-removal location where the presence, in an active position, of one of a plurality of blades causes excess liquid to be removed, and performing a blade-replacement operation in accordance with a control function. The control function can be performed by a blade-replacement controller that controls the operation of a blade-replacement mechanism to ensure that replacement of a blade in the active position with a different blade takes place only when the section of the ITM being transported past the excess-removal location is one of a plurality of pre-determined sections. In some embodiments of the method the printing system additionally comprises a plurality of input devices, and in some embodiments, the performing of a blade-replacement operation in accordance with a control function can comprise receiving at least one of location information and ITM rotation speed information from one or more input devices, determining (using the at least one of location information and ITM rotation speed information received from the one or more input devices), whether a section of the ITM is one of a plurality of pre-determined sections of the ITM, and initiating a blade-replacement operation by the blade-replacement mechanism based on the determining.

In some embodiments of the method, the performing a blade-replacement operation in accordance with a control function can comprise determining whether a section of the ITM fulfills a control function rule for performance of a blade-replacement operation, and can also comprise initiating a blade-replacement operation by the blade-replacement mechanism based on the determining. In some embodiments, performing a blade-replacement operation in accordance with a control function can additionally comprise retrieving the control function rule from computer storage.

According to embodiments of the method, the control function rule can be included in program instructions executed by one or more processors of the blade-replacement controller.

According to some embodiments, the blade-replacement controller can control the blade-replacement mechanism to perform the blade-replacement operations only when the section of the ITM being transported past the excess-removal location is a pre-selected one of a plurality of pre-determined sections. According to some embodiments, the blade-replacement controller can additionally control the blade-replacement mechanism to avoid performing blade-replacement operations while ink images are being transferred to a sheet of substrate at the impression station. In some embodiments of the method, the blade-replacement controller controls the blade-replacement mechanism in accordance with a timing scheme.

According to embodiments of the method, the printing system can include a coating thickness-regulation assembly that comprises a blade-holder (which can comprise a cylinder or polygonal cylinder and can be rotatable), where each of the plurality of blades is radially extended from the blade-holder, the blade-replacement mechanism can comprise a motor, and the blade-replacement operation can comprise rotating the coating-thickness-regulation assembly.

In embodiments of the method, the coating thickness-regulation assembly and the blade-replacement mechanism can be configured so that at a first time before a blade-replacement operation, only a first blade is in the active position, and then at a second time during a blade-replacement operation, the first blade and a second blade are both in the active position, and then at a third time after a blade-replacement operation, only the second blade is in the active position. In some embodiments, the blade-replacement controller can control the blade-replacement operation so as to enforce a rule whereby a blade-replacement operation is performed exactly once during each rotation of the ITM.

In some embodiments of the method, the ITM can comprise first and second pluralities of pre-determined sections, where the first and second pluralities are mutually exclusive and together comprise all the sections of the ITM. In these embodiments, the blade-replacement controller can comprise a non-transitory computer-readable medium containing program instructions, wherein execution of the program instructions by one or more processors of a computer system causes the one or more processors to carry out at least one of causing the blade-replacement mechanism to perform a blade-replacement operation only when one of the first plurality of pre-determined sections of the ITM traverses the excess-removal location, and causing the blade-replacement mechanism to avoid performing a blade-replacement operation when one of the second plurality of pre-determined sections of the ITM traverses the excess-removal location.

In embodiments, a printing system can comprise an intermediate transfer member (ITM) comprising a flexible endless belt, an image forming station configured to form ink images by droplet deposition upon a surface of the ITM moving through the image forming station, an impression station where the ink images are transferred to substrate from the ITM surface, a conveyer for driving rotation of the ITM to transport the ink images towards the impression station, a treatment station disposed downstream of the impression station and upstream of the image forming station configured for coating the ITM surface with a layer of a liquid treatment formulation—where the treatment station can comprise an applicator for applying the liquid treatment formulation to the surface of the ITM, and a coating thickness-regulation assembly comprising a blade, the blade disposed so that a tip of the blade removes excess treatment formulation from the surface of the portion of the ITM traversing the treatment station to leave only the desired layer of treatment formulation—and a controller configured to detect a non-uniform stretching of the ITM associated with the traversal of the treatment station by the portion of the ITM and respond by modulating a timing of the droplet deposition so as to compensate for the non-uniform stretching. In some embodiments, the non-uniform stretching is caused by the interaction of the blade with the surface of the ITM.

In embodiments, a printing system can comprise an intermediate transfer member (ITM) comprising a flexible endless belt, an image forming station configured to form ink images by droplet deposition upon a surface of the ITM moving through the image forming station, an impression station where the ink images are transferred to substrate from the ITM surface, a conveyer for driving rotation of the ITM to transport the ink images towards the impression station, a treatment station disposed downstream of the impression station and upstream of the image forming station configured for coating the ITM surface with a layer of a liquid treatment formulation—where the treatment station can comprise an applicator for applying the liquid treatment formulation to surface of the ITM, and a coating thickness-regulation assembly comprising a blade, the blade disposed so that a tip of the blade interacts with the surface of the ITM so as to remove excess treatment formulation from the surface of the ITM and leave only the desired layer of treatment formulation—and a controller configured to detect a non-uniform stretching of the ITM caused by the interaction of the blade with the surface of the ITM and respond by modulating a timing of the droplet deposition so as to compensate for the non-uniform stretching caused by the interaction of the blade with the surface of the ITM.

In any of the foregoing printing systems, the controller can additionally be configured to report detections of non-uniform stretching to an operator or to a log file. The coating thickness-regulation assembly can additionally comprise at least one additional blade and be configured so that for at least a part of the time each one of the blades is in an active position to interact physically with the surface of the ITM so as to remove excess treatment formulation from the surface of the ITM.

In embodiments, a printing system can comprise an intermediate transfer member (ITM) comprising a flexible endless belt, an image-forming station configured to form ink images by droplet deposition upon a surface of the ITM moving through the image forming station, an impression station where the ink images are transferred to substrate from the ITM surface, a conveyer for driving rotation of the ITM to transport the ink images towards the impression station, a treatment station disposed downstream of the impression station and upstream of the image-forming station configured for coating the ITM surface with a layer of a liquid treatment formulation—wherein the treatment station comprises an applicator for applying the liquid treatment formulation to the ITM, a coating thickness-regulation assembly comprising a plurality of blades, the assembly configured so that for at least a part of the time each one of the blades is in an active position, so as to leave only the desired layer of treatment formulation on the surface of the ITM as it traverses the blade in the active position, and a blade-replacement mechanism, associated with the coating thickness-regulation assembly and configured for performing blade-replacement operations to replace a blade in the active position with another blade, wherein a blade-replacement operation causes a local stretching of the ITM proximate to the portion of the ITM passing a blade in the active position—and a controller configured to detect said local stretching of the ITM and respond by modulating a timing of the droplet deposition so as to compensate for said local stretching of the ITM. In some embodiments, the local stretching of the ITM can be propagated to another part of the ITM and not be manifested proximate the portion of the ITM passing a blade in the active position.

In the foregoing printing systems, the modulating can be delayed by the travel time of the non-uniformly stretched section of the ITM between the treatment station and the image-forming station.

In embodiments, a method of operating a printing system wherein ink images are formed upon a surface of a rotating intermediate transfer member (ITM) by droplet deposition, transported towards an impression station and transferred to substrate, and wherein the printing system includes a coating thickness-regulation assembly comprising a blade, can comprise using a coating applicator, applying an excess of liquid treatment formula to a section of the surface of the rotating ITM downstream of the impression station, transporting the section of the ITM with an excess of liquid treatment formulation past an excess-removal location where the presence of a blade causes excess liquid to be removed by interaction between the blade and the ITM and responsively to a detection of a non-uniform stretching of the ITM, modulating a timing of the droplet deposition so as to compensate for the non-uniform stretching. In some embodiments, the non-uniform stretching is caused by the interaction of the blade with the surface of the ITM.

In embodiments, a method of operating a printing system wherein ink images are formed upon a surface of a rotating intermediate transfer member (ITM) by droplet deposition, transported towards an impression station and transferred to substrate, and wherein the printing system includes a coating thickness-regulation assembly comprising a blade, can comprise using a coating applicator, applying an excess of liquid treatment formula to a section of the surface of the rotating ITM downstream of the impression station, transporting the section of the ITM with an excess of liquid treatment formulation past an excess-removal location where the presence of a blade causes excess liquid to be removed by interaction between the blade and the ITM and responsively to a detection of a non-uniform stretching of the ITM caused by the interaction of the blade with the surface of the ITM, modulating a timing of the droplet deposition so as to compensate for the non-uniform stretching caused by the interaction of the blade with the surface of the ITM.

In some embodiments, the method additionally comprises the step of responsively to the detection of repeated non-uniform stretchings of the ITM, adjusting the physical position of the blade. In some embodiments, the detection of the non-uniform stretching of the ITM is done by a controller of the printing system. The controller can be additionally configured to report detections of non-uniform stretching to an operator or to a log file.

In embodiments, a method of operating a printing system wherein the printing system includes a rotating intermediate transfer member (ITM) upon which ink images are formed at an image-forming station by droplet deposition, and additionally includes a treatment station upstream of the image-forming station—wherein the treatment station comprises a coating applicator for applying a liquid treatment formulation to the ITM, a coating thickness-regulation assembly comprising a plurality of blades, and a blade-replacement mechanism for performing blade-replacement operations so as to change which blade interacts with the ITM to remove excess liquid treatment formulation from the surface of the ITM—can comprise using the blade-replacement mechanism to perform blade-replacement operations, detecting local stretching of a portion of the ITM that either intersects or is proximate to the portion of the ITM passing the treatment station during a blade-replacement operation, wherein the local stretching is at least partially caused by the blade-replacement operation, and responding to a detection of said local stretching of the ITM by modulating a timing of the droplet deposition so as to compensate for said local stretching of the ITM. In some embodiments, the modulating can be delayed by the travel time of the non-uniformly stretched section of the ITM between the treatment station and the image-forming station.

According to embodiments, a method of operating a printing system wherein ink images are formed upon a surface of a rotating intermediate transfer member (ITM) by droplet deposition, transported towards an impression station and transferred to substrate, and wherein the printing system includes a coating thickness-regulation assembly comprising a blade, can comprise: using a coating applicator, applying an excess of liquid treatment formula to a section of the surface of the rotating ITM downstream of the impression station, transporting the section of the ITM with an excess of liquid treatment formulation past an excess-removal location where the presence of a blade causes excess liquid to be removed by interaction between the blade and the ITM, and, in response to the detection of non-uniform stretchings of the ITM, wherein the non-uniform stretchings are associated with the traversal of the excess-removal location by the section of the ITM, adjusting the position of the blade.

In some embodiments, a printing system can comprise an intermediate transfer member (ITM) comprising a flexible endless belt, an image forming station configured to form ink images by droplet deposition upon a surface of the ITM moving through the image forming station, an impression station where the ink images are transferred to substrate from the ITM surface, a conveyer for driving rotation of the ITM to transport the ink images towards the impression station, a treatment station disposed downstream of the impression station and upstream of the image forming station configured for coating the ITM surface with a layer of a liquid treatment formulation—wherein the treatment station can comprise an applicator for applying the liquid treatment formulation to the surface of the ITM, and a coating thickness-regulation assembly comprising a blade, the blade disposed so that a tip of the blade removes excess treatment formulation from the surface of the portion of the ITM traversing the treatment station to leave only the desired layer of treatment formulation—and a controller configured to detect a non-uniform stretching of the ITM associated with the traversal of the treatment station by the portion of the ITM and respond by adjusting the position of the blade or by reporting to an operator or to a log file that a blade-position adjustment is recommended.

BRIEF DESCRIPTION OF THE DRAWINGS

The invention will now be described further, by way of example, with reference to the accompanying drawings, in which the dimensions of components and features shown in the figures are chosen for convenience and clarity of presentation and not necessarily to scale. In the drawings.

DETAILED DESCRIPTION OF THE ILLUSTRATED EMBODIMENTS

Figure 1:
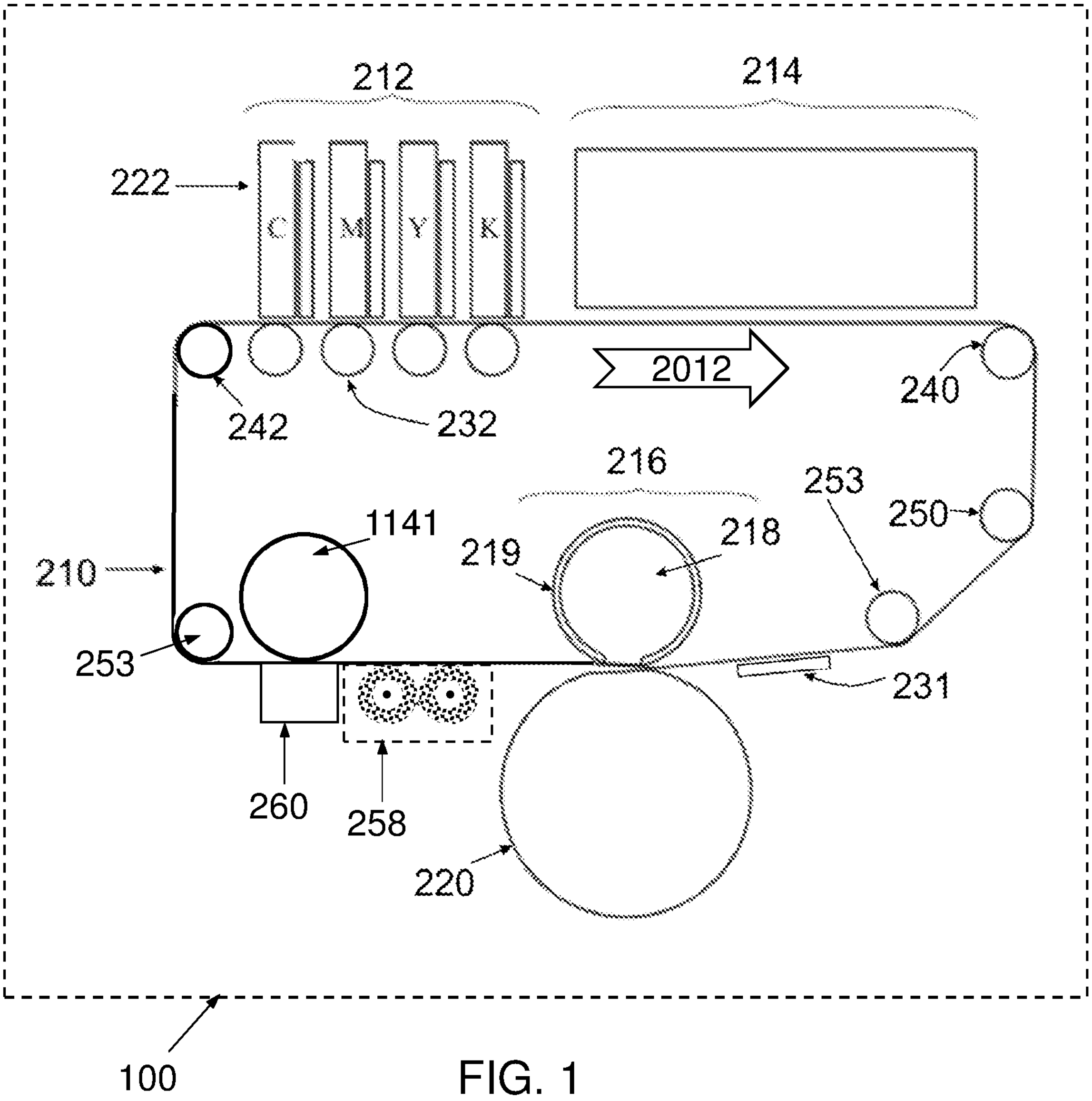
FIG. 1 is an elevation-view illustration of a printing system according to embodiments.

The invention is herein described, by way of example only, with reference to the accompanying drawings. With specific reference now to the drawings in detail, it is stressed that the particulars shown are by way of example and for purposes of illustrative discussion of the preferred embodiments of the present invention only, and are presented in the cause of providing what is believed to be the most useful and readily understood description of the principles and conceptual aspects of the invention. In this regard, no attempt is made to show structural details of the invention in more detail than is necessary for a fundamental understanding of the invention, the description taken with the drawings making apparent to those skilled in the art how the several forms of the invention may be embodied in practice. Throughout the drawings, like-referenced characters are generally used to designate like elements.

For convenience, in the context of the description herein, various terms are presented here. To the extent that definitions are provided, explicitly or implicitly, here or elsewhere in this application, such definitions are understood to be consistent with the usage of the defined terms by those of skill in the pertinent art(s). Furthermore, such definitions are to be construed in the broadest possible sense consistent with such usage.

"Control functions" as used herein means functions performed by a controller, including, but not exhaustively: retrieving data from computer storage; retrieving system operating rules from computer storage (also called "rules" or "control function rules"); applying rules; receiving data from input devices; executing program instructions; making calculations, determinations and decisions by executing program instructions; and transmitting electronic or electrical signals to printing system components to initiate, modify or stop an operation.

A "controller" as used herein is intended to describe any processor, or computer comprising one or more processors, configured to control one or more aspects of the operation of a printing system or of one or more printing system components according to program instructions that can include rules, machine-learned rules, algorithms and/or heuristics, the programming methods of which are not relevant to this invention. A controller can be a stand-along controller with a single function as described, or alternatively can combine more than one control function according to the embodiments herein and/or one or more control functions not related to the present invention or not disclosed herein. For example, a single controller may be provided for controlling all aspects of the operation of a printing system, the control functions described herein being one aspect of the control functions of such a controller. Similarly, the functions disclosed herein with respect to a controller can be split or distributed among more than one computer or processor, in which case any such plurality of computers or processors are to be construed as being equivalent to a single computer or processor for the purposes of this definition. For purposes of clarity, some components associated with computer networks, such as, for example, communications equipment and data storage equipment, have been omitted in this specification but a skilled practitioner will understand that a controller as used herein can include any network gear or ancillary equipment necessary for carrying out the functions described herein.

In various embodiments, an ink image is first deposited on a surface of an intermediate transfer member (ITM), and transferred from the surface of the intermediate transfer member to a substrate (i.e. sheet substrate or web substrate). For the present disclosure, the terms "intermediate transfer member", "image transfer member" and "ITM" are synonymous, and may be used interchangeably. The location at which the ink is deposited on the ITM is referred to as the "image forming station". In many embodiments, the ITM comprises a "belt" or "endless belt" or "blanket" and these terms are used interchangeably with ITM. The area or region of the printing press at which the ink image is transferred to substrate is an "impression station". It is appreciated that for some printing systems, there may be a plurality of impression stations.

For an endless intermediate transfer member, the "length" of an ITM is defined as the circumference thereof. An endless intermediate transfer member can be formed by joining two ends of a belt with a seam. A seam can be created by any method of joining the two ends of the belt depending on the materials used in the belt, and can include, for example: sewing, closing a zipper, using hook-and-loop fasteners, heat welding and ultrasonic welding, and can join the ends using, for example: rivets, screws, bolts, snaps, clips, fasteners comprising a metal, a plastic or a composite material, or an adhesive. These examples are not meant to be exhaustive but rather to illustrate the variety of joining methods available to the skilled practitioner.

Referring now to the figures, FIG. 1 is a schematic diagram of a printing system 100 according to some embodiments of the present invention. The printing system 100 of FIG. 1 comprises an intermediate transfer member (ITM) 210 comprising a flexible endless belt mounted over a plurality of guide rollers 232, 240, 250, 253, 242. In other examples (NOT SHOWN), the ITM 210 is a drum or a belt wrapped around a drum. This figure shows aspects of a specific configuration relevant to discussion of the invention, and the shown configuration is not limited to the presented number and disposition of the rollers, nor is it limited to the shape and relative dimensions, all of which are shown here for convenience of illustrating the system components in a clear manner.

Figure 3:
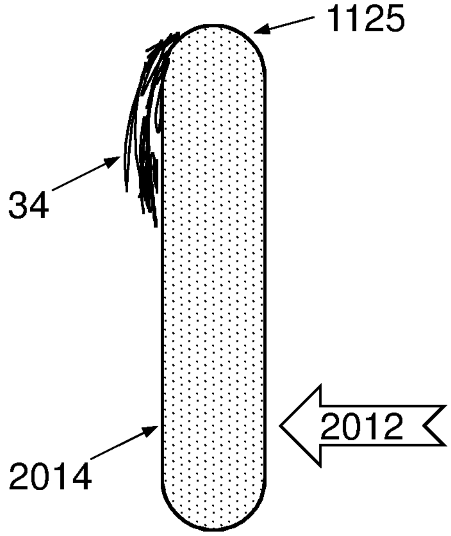
FIG. 3 is an elevation-view illustration of a doctor blade with solute build-up according to embodiments.

In the example of FIG. 1, the ITM 210 rotates in the clockwise direction relative to the drawing. The direction of belt movement defines upstream and downstream directions. Rollers 242, 240 are respectively positioned upstream and downstream of the image forming station 212—thus, roller 242 may be referred to as a "upstream roller" while roller 240 may be referred to as a "downstream roller". The printing system 100 further comprises:

(a) an image forming station 212 comprising print bars 222A-222D (each designated one of C, M Y and K), where each print bar comprises ink jet printing head(s) 223 as shown in FIG. 3. The image forming station 212 is configured to form ink images (NOT SHOWN) upon a surface of the ITM 210 (e.g., by droplet deposition thereon);

(b) a drying station 214 for drying the ink images;

(c) an impression station 216 where the ink images are transferred from the surface of the ITM 210 to sheet 231 or web substrate (only sheet substrate is illustrated in FIG. 1).

In the particular non-limiting example of FIG. 1, the impression station 216 comprises an impression cylinder 220 and a blanket/pressure cylinder 218 that carries a compressible blanket 219.

(d) a cleaning station 258 upstream from the impression station (which can comprise cleaning brushes, as shown in FIG. 1, which is only one example of a cleaning solution that can be employed in the system) where residual material (e.g. treatment film and/or ink images or portions thereof or other residual material) is cleaned from the surface of the ITM 210.

(e) a treatment station 260 upstream from the impression station and the cleaning station (where a layer of liquid treatment formulation (e.g. aqueous treatment solution) is applied on the ITM surface. As an example, the treatment solution can comprise a dilute solution of a charged polymer can be a suitable liquid treatment formulation. Backing roller 1141 is disposed on the other side of the ITM 210 from treatment station 260.

The skilled artisan will appreciate that not every component illustrated in FIG. 1 is required. Also, the cooling and the cleaning stations can be combined in a single station, which can also fulfill a cooling function, for cooling the ITM 210 before it continues to the image forming station 212.

Examples of Doctor Blade Design and Function

The following paragraphs provide illustrative, non-limiting examples of the design and function of doctor blades according to various embodiments of the invention.

Figure 2A:
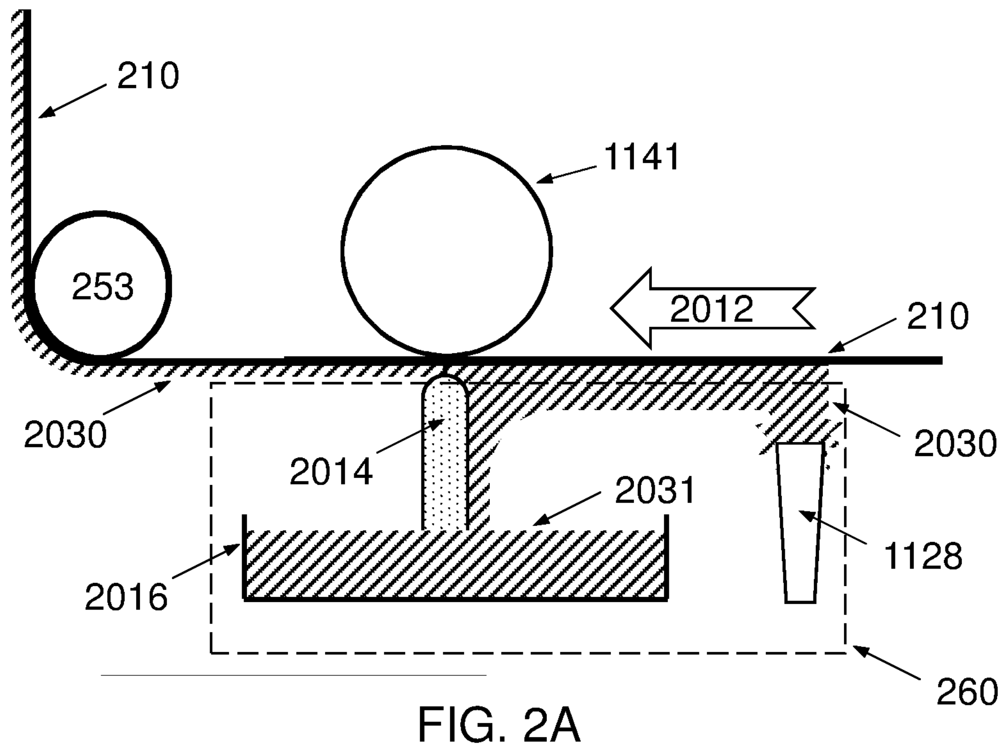
FIGS. 2A, 2B and 2C are elevation-view illustrations of components of a printing system according to embodiments.

FIG. 2A schematically illustrates, in cross-section, one non-limiting example of a treatment station 260, where the treatment station 260 comprises an applicator, in this example a treatment solution fountain 1128 configured to apply treatment solution 2030 to a surface of ITM 210, a doctor blade 2014 positioned so as to remove excess treatment solution 2031 from the ITM, and a tank 2016 of excess treatment solution 2031. In the drawing, the illustrated part of the ITM 210 moves from right to left as viewed (i.e., as being part of a lower run of a clockwise rotation), as represented by an arrow 2012, over the doctor blade that is generally designated 2014 and is suitably mounted within a tank 2016. In the example of FIG. 2A, the doctor blade 2014 is formed of a rigid bar with a smooth and regular cylindrical surface that extends across the entire width of the ITM 210.

Prior to passing over the doctor blade 2014, the underside of the ITM 210 (or lower run) is coated with an excess of treatment formulation (e.g. solution) 2030. Neither the manner in which the excess of treatment formulation (e.g. solution) is applied to the ITM 210 nor the type of applicator used for coating is of fundamental importance to the present invention; the ITM 210 may for example simply be immersed in a tank containing the liquid, passed over a fountain 1128 of the treatment formulation (e.g. treatment solution) 2030 as shown in FIG. 2A, or sprayed with an upwardly directed jet (NOT SHOWN). The skilled practitioner will recognize that treatment solution can be applied to the ITM 210 by any suitable applicator such as mentioned here, or by other means, and not just as disclosed herein.

As shown in the drawing, as the ITM 210 approaches the doctor blade 2014 it has a coating 2030 of liquid that is greater or significantly greater than the desired thickness. The function of the doctor blade 2014 is to remove excess liquid 2031 from the ITM 210 and ensure that the remaining liquid is spread evenly and uniformly over the entire surface of the ITM 210. In a non-limiting example, the doctor blade 2014 may be urged towards the ITM 210 while the latter is maintained under tension. For example, it may be urged towards the ITM 210 and thereby press ITM 210 against backing roller 1141. In another example, backing roller 1141 can be urged downward to provide additional force as ITM 210 traverses the doctor blade 2014. While shown as a cylindrical roller, backing roller 1141 can in fact have a flat, oval or oblong surface facing the ITM 210, the principle being that there is an object on the side of the ITM 210 opposite the doctor blade 2014 with a countering force or presence that increases the effectiveness of the excess-removal function of the doctor blade 2014. In some embodiments, the backing roller 1141 can have a soft or compressible surface or surface layer such that the tip of a doctor blade 2014 pushes the flexible ITM 210 to 'penetrate' or deform the surface backing roller 1141, as illustrated schematically in FIG. 2C. The compressibility of surface of the backing roller 1141 and/or the extent to which a doctor blade 2014 causes the penetration or deformation of the surface of the backing roller 1141 is used as a factor, in some embodiments, in regulating the thickness of the treatment solution 2030 on the surface of the ITM 210. The embodiment illustrated in FIG. 2C and the feature of penetration or deformation of the backing roller 1141 can be used in combination with any of the other embodiments herein even if the feature is not explicitly mentioned.

The skilled practitioner will recognize that treatment solution can be applied to the ITM 210 by other means, and excess liquid 2031 can be removed by other means.

Figure 2B:
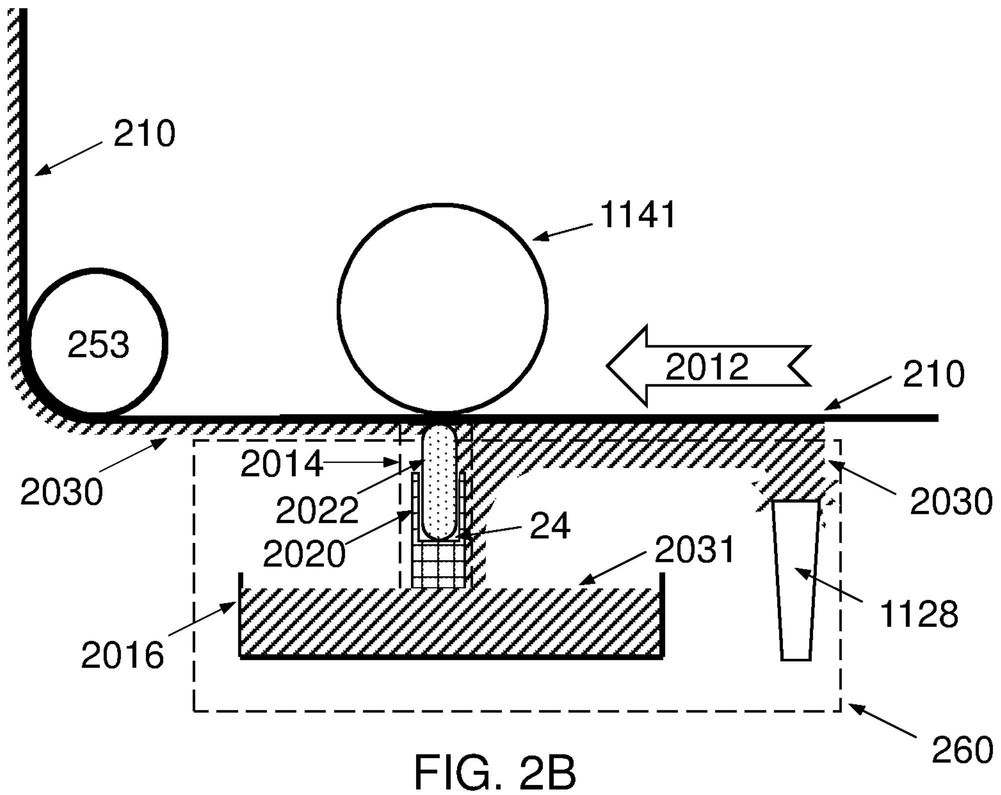

In another example of a treatment station illustrated schematically in FIG. 2B, doctor blade 2014 can comprise a doctor bar 2020 and a doctor rod 2022. The doctor bar 2020 preferably has a groove 24 or, equivalently, a notch or opening, in which doctor rod 2022 is installed, and may be of more robust construction than the doctor rod 2022. In some embodiments, doctor bar 2020 is rigid and extends across the entire width of the ITM 210. In its upper surface facing the underside of the ITM 210, the bar 2020 is formed with a channel or groove 24 within which there is supported a rod 2022. The function and operation of the treatment station 260 in FIG. 2B is the same as in FIG. 2A. The doctor rod 2022 can be held within groove 24 by any means such as, for example, welding, adhesives, friction, or mechanical fasteners such as screws or bolts.

In embodiments, the tip of the doctor blade 2014 comprises a smooth rod 2022 with a uniform radius over the width of the ITM 210, and its smoothness ensures laminar flow of the liquid in the gap between it and the underside of the ITM 210. The nature of the flow may be similar to that of the liquid lubricant in a hydrodynamic bearing and reduces the film of liquid 2030 that remains adhering to the surface of the ITM 210 to a thickness dependent upon the force urging the ITM 210 against the doctor blade 2014 and the radius of curvature of the rod 2022. As both the radius and the force are constant over the width of the web, the resulting film is uniform and its thickness can be set by appropriate selection of the applied force and the rod diameter.

The tank 2016 into which the surplus treatment formulation (e.g. solution) falls may be the main reservoir tank from which liquid is drawn to apply treatment formulation 2030 to the underside of the web with an excess of treatment formulation 2030 (e.g. solution) or it may be a separate tank that is drained into a main reservoir tank (NOT SHOWN) and/or emptied to suitable discard systems (NOT SHOWN).

The rod 2022 is preferably made of a hard material such as, for example, a hardened steel or fused quartz to resist abrasion. There may be small particles of grit or dust in the liquid which could damage the rounded edge over which the liquid flows. In embodiments, the material should be capable of being formed into a smooth rod of uniform diameter or thickness, and a surface roughness where it contacts the ITM of less than 10 microns, in particular of less than 0.5 micron. The cross-section of the doctor rod 2022 can have a circular cross-section (in the plane orthogonal to a floor), or alternatively the cross-section can have any rounded shape, for example elliptical or oval, or have a rounded tip 1125 as illustrated in FIG. 3. The doctor rod 2022 may have a radius or thickness of 6 mm but possibly of only 0.5 mm, which would be relatively fragile and possibly require mechanical support, for example by a doctor bar 2020.

Sometimes when using such a doctor blade in connection with the application of certain formulations (e.g. solution), a deposit 34 of the solute builds up on the downstream side of the doctor blade 2014, as schematically illustrated in FIG. 3. FIG. 3 shows the single-component doctor blade 2014 example described with reference to FIG. 2A, but the build-up of solute is equally applicable to the two-component doctor blade 2014 example of FIG. 2B, i.e., where doctor blade 2014 comprises a doctor bar 2020 and a doctor rod 2022. The formation of such a deposit and its composition, if allowed to grow excessively, will eventually interfere with the layer of treatment formulation (e.g. solution) applied to the ITM 210.

Changing or Replacing Doctor Blades

Figure 4:
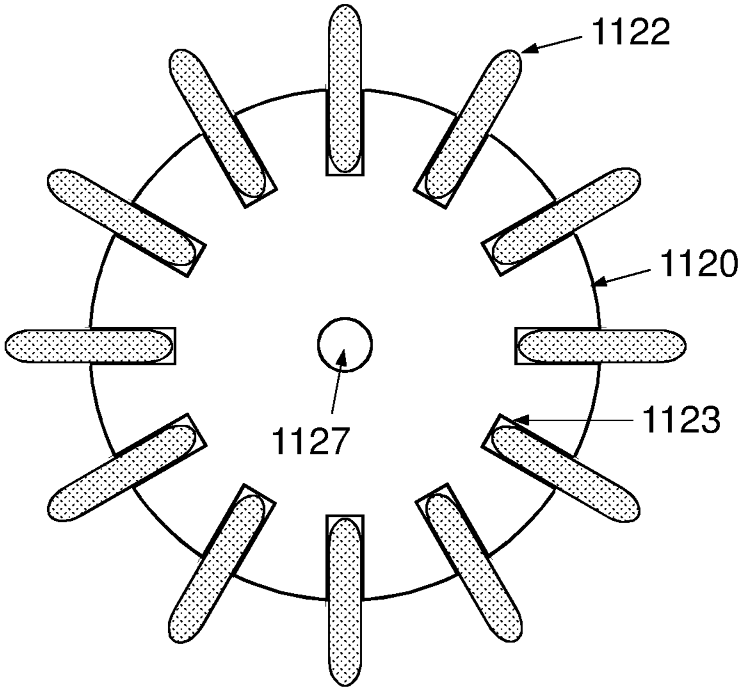
FIGS. 4, 5A and 5B are alternative elevation-view illustrations of components of a coating thickness-regulation assembly according to embodiments.

Embodiments of the invention relate to apparatus and methods for changing or replacing the doctor blade when it becomes soiled. FIG. 4 illustrates an example of how a doctor blade may be changed easily, and preferably without the need to interrupt the web coating process, or the printing system that requires a conditioning agent to be applied to its ITM.

In the non-limiting example of FIG. 4, twelve doctor blades 1122 are mounted uniformly in recesses 1123 around the circumference of a cylindrical turret 1120 which is rotatable about an axis 1127. The cylindrical turret 1120 serves a blade holder for a plurality of blades. The radially extending doctor blades 1122 behave in the same way as the doctor rods 2022 in FIG. 2B and the turret 1120 serves the same purpose and function as a rod holder as does the doctor bar 2020 in FIG. 2B. Instead of using rods of circular, oval or elliptical cross section, the doctor blades 1122 are constructed as elongated strips having smooth, rounded and polished edges. Strips having rounded edges of uniform radius of curvature may be produced, for example, by flattening rods of circular cross section. The doctor blades 1222 may suitably be made of stainless steel, but other hard materials resistant to abrasion may alternatively be used.

Figure 5A:
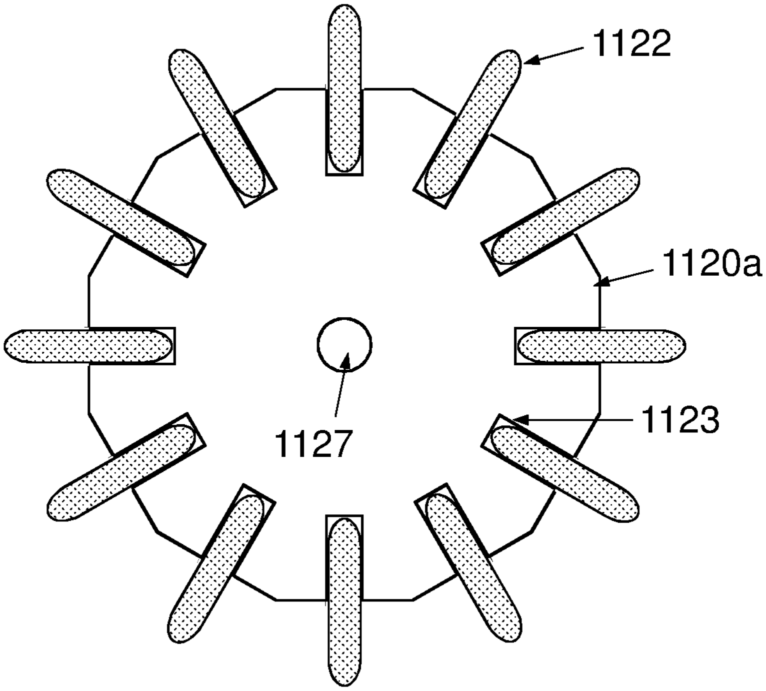
Figure 5B:
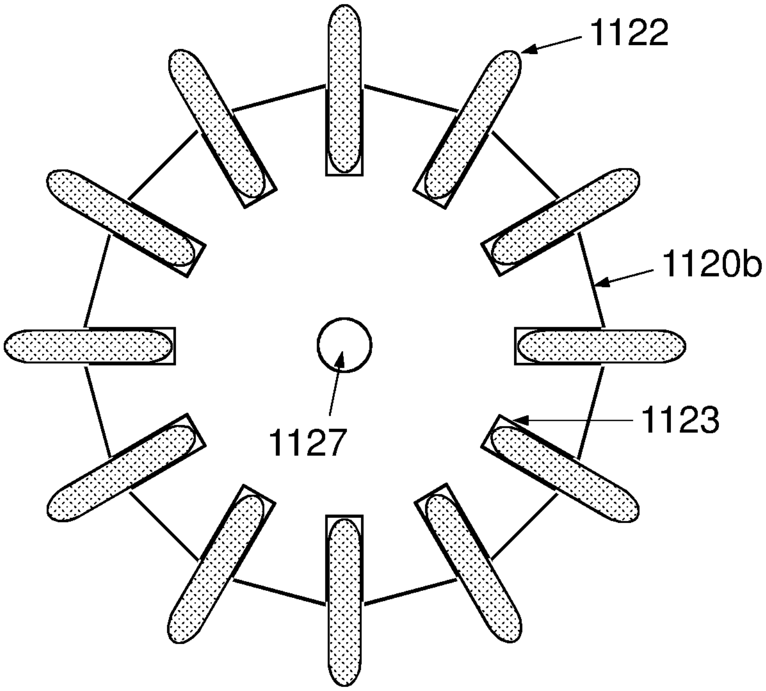

It will be obvious to the skilled practitioner that the blade-holder (e.g., the turret) may have a different configuration than that illustrated here without changing its function. For example, as illustrated in FIGS. 5A and 5B, a cylindrical rotatable turret 1120A can have a polygonal cross-section rather than a circular cross-section. In FIG. 5A, for example, the doctor blades 1122 are radially extended from the sides of the polygonal cylinder 1120*a*, while in FIG. 5B the doctor blades 1122 are radially extended from the corners of the polygonal cylinder 1120*b*. It should be appreciated that the number of blades and polygon sides, as well as roundness of the corners and other aspects of the geometry, can be selected by a skilled practitioner when designing such a system. In different embodiments, a blade-holder can comprise a solid cylinder or alternatively comprise a skeletal structure, as long it is designed to perform the same functions, e.g., gripping a plurality of doctor blades 1122 and being rotatable. For purposes of clarity, the discussion herein will just refer to turret 1120 but that should be understood henceforth to include variants such as 1120*a* or 1120*b*.

In other embodiments, the replacement of blades can be accomplished with other arrangements that do not require the blade-holder to be rotatable.

Figure 6:
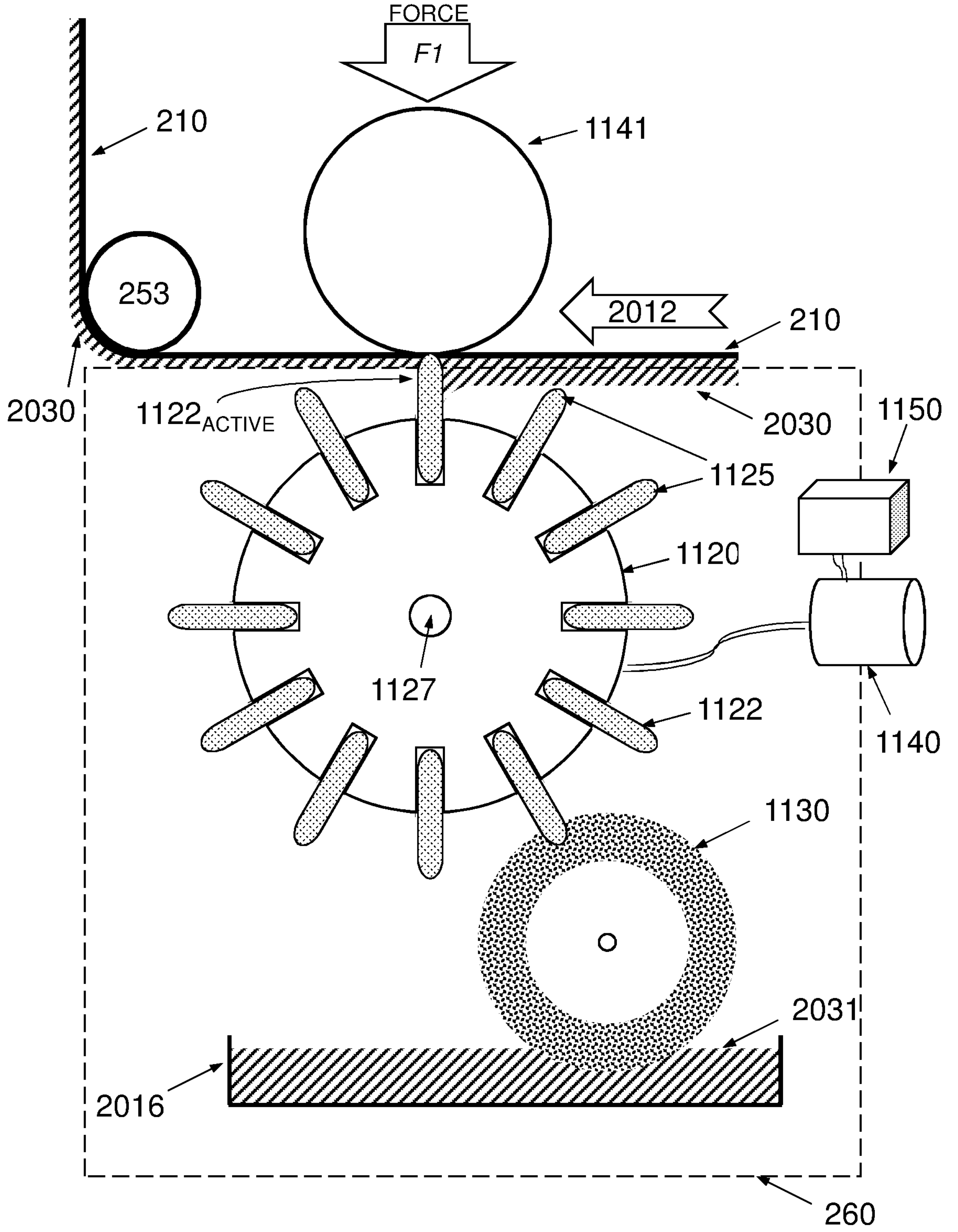
FIG. 6 is an elevation-view illustration of components of a printing system according to embodiments.

The manner in which the turret 1120 and the doctor blades 1122 interact with the ITM 210 is shown in FIG. 6 which illustrates one example of a treatment station 260 in further detail.

In the example of FIG. 6, a single one of the twelve doctor blades 1122 is facing the ITM 210 in a position (called the 'active position' in this disclosure) that causes removal of excess liquid, e.g., treatment formulation, as the ITM 210 traverses the location of single one of the twelve doctor blades 1122 while moving in the print direction indicated by arrow 2012. The coating process as described above in the discussion referencing FIG. 2A is also relevant to the embodiments illustrated here. In FIG. 6, a single one of the blades $\mathbf{1122}_{ACTIVE}$ is closest to the ITM 210 of any of the blades 1122, and therefore is the 'active blade' for removal of excess treatment solution 2031; a tip 1125 of the active blade $\mathbf{1122}_{ACTIVE}$ faces the ITM 210. The other doctor blades 1122 shown in the drawing are said to be 'inactive'. The location at which an active doctor blade $\mathbf{1122}_{ACTIVE}$ is positioned facing the ITM 210 in order to remove therefrom the excess treatment solution 2031 will henceforth be termed herein the 'excess-removal location'.

As the ITM 210 rotates and a portion of the ITM 210 traverses this excess-removal location in the direction indicated, it is this single one of the blades $\mathbf{1122}_{ACTIVE}$ that causes an excess of treatment formulation 2030 to be removed from the surface of the portion of the ITM 210. FIG. 6 shows schematically the position of the illustrated elements at a particular point in time; at another time (NOT SHOWN), a doctor blade 1122 that is shown as inactive in FIG. 6 might be active, and the active doctor blade $\mathbf{1122}_{ACTIVE}$ shown in FIG. 6 might be inactive.

The active doctor blade $\mathbf{1122}_{ACTIVE}$ (or a rounded tip 1125 thereof), together with the blade holder (in the figure, turret 1120) and other doctor blades 1122 not in an the active position, and backing roller 1141 (or alternatively a device for providing air pressure towards rounded tip 1125), collectively comprise a coating thickness-regulation assembly, in that the thickness of the treatment formulation 2030 remaining on the part of the ITM 210 that has traversed the excess-removal location may be regulated according to, inter alia, an amount of force F1 impelling the tip 1125 of active doctor blade $\mathbf{112}_{ACTIVE}$ towards the opposing portion of ITM 210, or vice versa. As shown earlier in FIG. 2C, the force F1 can cause the active doctor blade $\mathbf{1122}_{ACTIVE}$ and the ITM 210 and a thin layer of treatment solution 2030 to penetrate or deform the backing roller 1141 and thereby contribute to regulating the thickness of treatment solution 2030. FIG. 6 shows the force F1 applied from the direction of the backing roller 1141 via ITM 210 to active doctor blade $\mathbf{1122}_{ACTIVE}$, and in some embodiments a similar force will be applied in the opposite direction, i.e., from the active doctor blade $\mathbf{1122}_{ACTIVE}$ towards the ITM 210 (at the location where backing roller 1141 is on the other side of the ITM 210). Regardless of which direction the force is applied from, the principle is that removal of excess liquid can be enhanced and regulated when a force normal to the ITM 210 is applied.

In the non-limiting example of FIG. 6, only one doctor blade 1122, specifically the active doctor blade $\mathbf{1122}_{ACTIVE}$, interacts with the ITM 210 at any given time. However, when a blade 1122 becomes soiled, for example with dried solution 34 (as shown in FIG. 3, but not shown in FIG. 6), it can be desirable to bring the next adjacent doctor blade 1122 into the active position as defined above. In this illustrated example, rotation of the turret 1120 is suitable for accomplishing this blade replacement. In order to enable a blade-replacement operation in which an active blade in the active position is replaced by a different blade heretofore not in the active position, then a blade-replacement mechanism, for example a motor 1140 that causes the turret 1120 to rotate about its axis, can be provided as shown.

In some embodiments, prior to returning to the active position by successive blade-replacement operations in which the turret 1120 is rotated, i.e., at some later stage in the turret rotation cycle, a soiled blade 1122 passes through a cleaning device, for example a stationary or rotating brush 1130, as illustrated schematically in FIG. 6, which removes any deposit and cleans the blade before it returns to the active position again.

In embodiments, the blade-replacement operation may be instigated on demand by an operator or it may be performed at regular intervals. In other embodiments, the blade-replacement operation can be controlled by a blade-replacement controller 1150 which applies a rule regarding when a blade-replacement operation takes place or doesn't take place. In some embodiments blade-replacement controller 1150 comprises a non-transitory computer-readable medium containing program instructions, wherein execution of the program instructions by one or more processors of a computer system causes the one or more processors to control when a blade-replacement mechanism performs or enables or facilitates a blade-replacement operation, or alternatively avoids or prevents a blade-replacement operation. The enablement or avoiding of a blade-replacement operation can be on the basis of timing, and it can be on the basis of what portion of the ITM 210 is allowed to be traversing or, alternatively, not allowed to be traversing, the excess-removal location at the time of the blade-replacement operation.

The number of doctor blades 1122 installed on the turret 1120 need not be twelve as has been shown, and any number of blades 1122 can be installed on the turret 1120. In some embodiments, it can be desirable for there to be a sufficient number so that during a changeover, i.e., a blade-replacement operation, there will be a time when two doctor blades 1122 are functional and interact with the ITM 210 (are 'active') at the same time and jointly occupy the excess-removal location. In this way, there is facilitated a substantially continuous transition from one blade being active to another being active, so that there need not be any interruption in operation of the coating thickness-regulation assembly, and this in turn permits a doctor blade 1122 to be changed without interruption of the printing system.

Figure 2C:
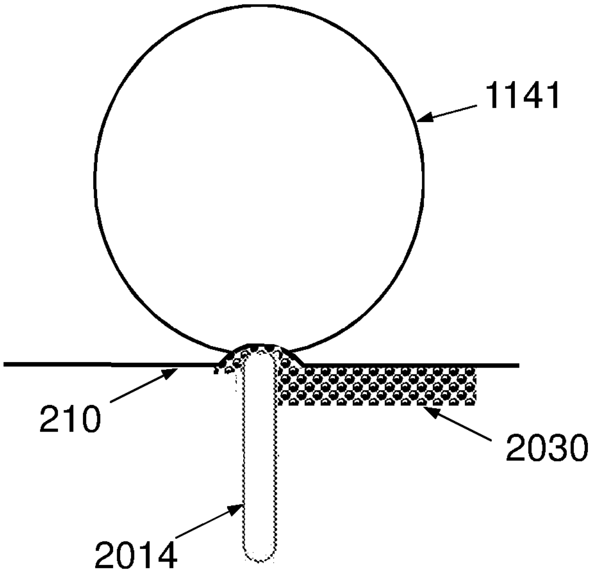
Figure 7:
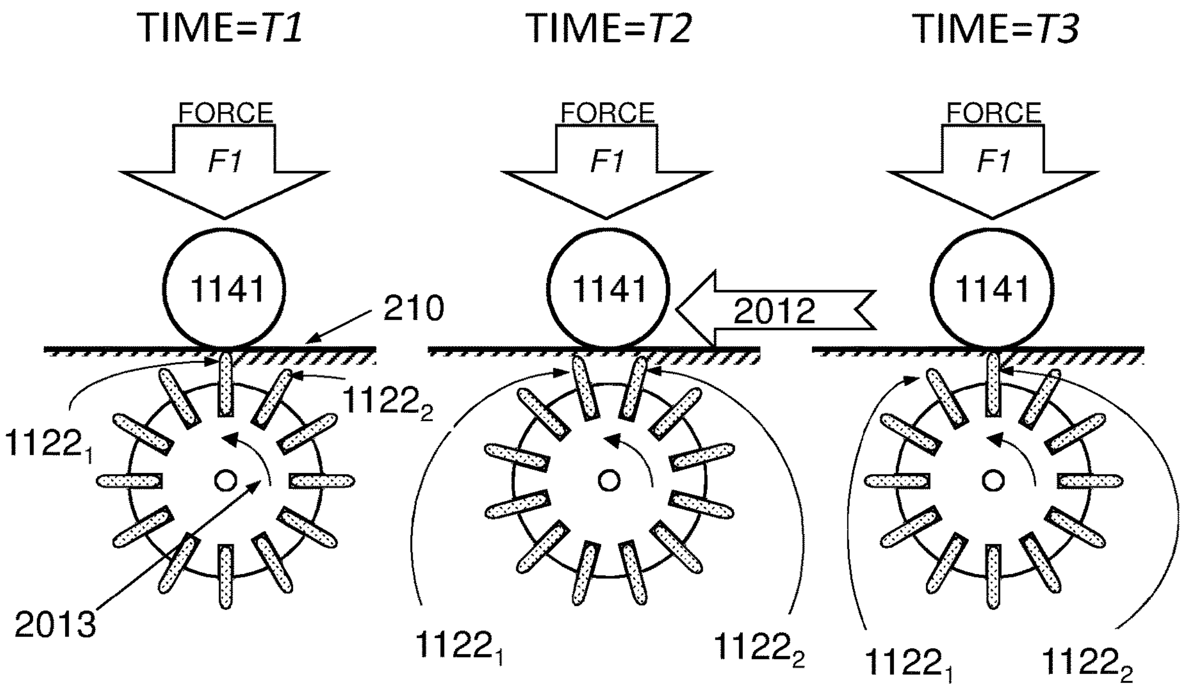
FIG. 7 contains illustrations of components of the coating thickness-regulation assembly of FIG. 4 at three different times in accordance with embodiments.

Referring now to FIG. 7, components of a printing system 100 in accordance with embodiments are illustrated at three different times. At Time T1 the figure illustrates a situation analogous to that illustrated in FIG. 6, in which a first doctor blade, here labeled $\mathbf{1122}_1$ but equivalent to $\mathbf{1122}_{ACTIVE}$ in FIG. 6, is the only doctor blade 1122 in the active position. Second doctor blade $\mathbf{1122}_2$ is in an inactive position vis-à-vis excess liquid removal. Because turret 1120 in this non-limiting example is configured to rotate counter-clockwise as indicated by arrow 2103, it should be clear that second doctor blade $\mathbf{1122}_2$ will be the next doctor blade to be in the active position following a blade-replacement operation that involved a counter-clockwise rotation of the turret 1120. Time T2 is a later time than T1, and a blade-replacement operation has been started but has not yet been completed. At this moment, first doctor blade $\mathbf{1122}_1$ has already begun to move out of the position that it held at Time T1, but has not yet reached an inactive position. Second doctor blade $\mathbf{1122}_2$ has begun to move via rotation toward the position previously held by first doctor blade $\mathbf{1122}_1$ at Time T1 but has not yet reached it. The coating thickness-regulation assembly and the blade-replacement mechanism are preferably configured so that at Time T2 both first and second doctor blades $\mathbf{1122}_1$ and $\mathbf{1122}_2$, respectively, are jointly in an active position, i.e., both blades are interacting with the ITM 210 and the providing continuous removal of excess liquid, where the excess removal continues to be aided by pressure or other force applied via or towards backing roller 1141 and the softness or compressibility of the backing roller 1141 as illustrated in FIG. 2C. It should be noted that when two blades 1122 are jointly in an active position as in FIG. 7 with respect to Time T2, then the term 'excess-removal location' should be construed to mean not the location of a single active blade but rather the location of the rectangularly-shaped planar segment that is defined by the respective tips 1125 of doctor blades $\mathbf{1122}_1$ and $\mathbf{1122}_2$, and substantially parallel to the ITM 210. At Time T3, the blade-replacement operation has been completed, and first doctor blade $\mathbf{1122}_1$ has reached an inactive position with its tip displaced far enough away from the ITM 210 so as not to interface with it for removal of excess liquid as the ITM 210 traverses the treatment station. Second doctor blade $\mathbf{1122}_2$ is now the only doctor blade in an active position, as it has moved into the active position previously held by first doctor blade $\mathbf{1122}_1$ at Time T1.

It should be clear to the skilled practitioner that the various examples described and illustrated herein for coating thickness-regulation assemblies and blade-replacement mechanism are not the only possible design choices possible for these components, as long as the basic principles of removing excess liquid (e.g., treatment formulation) and replacing blades in the active position are followed.

Figure 8:
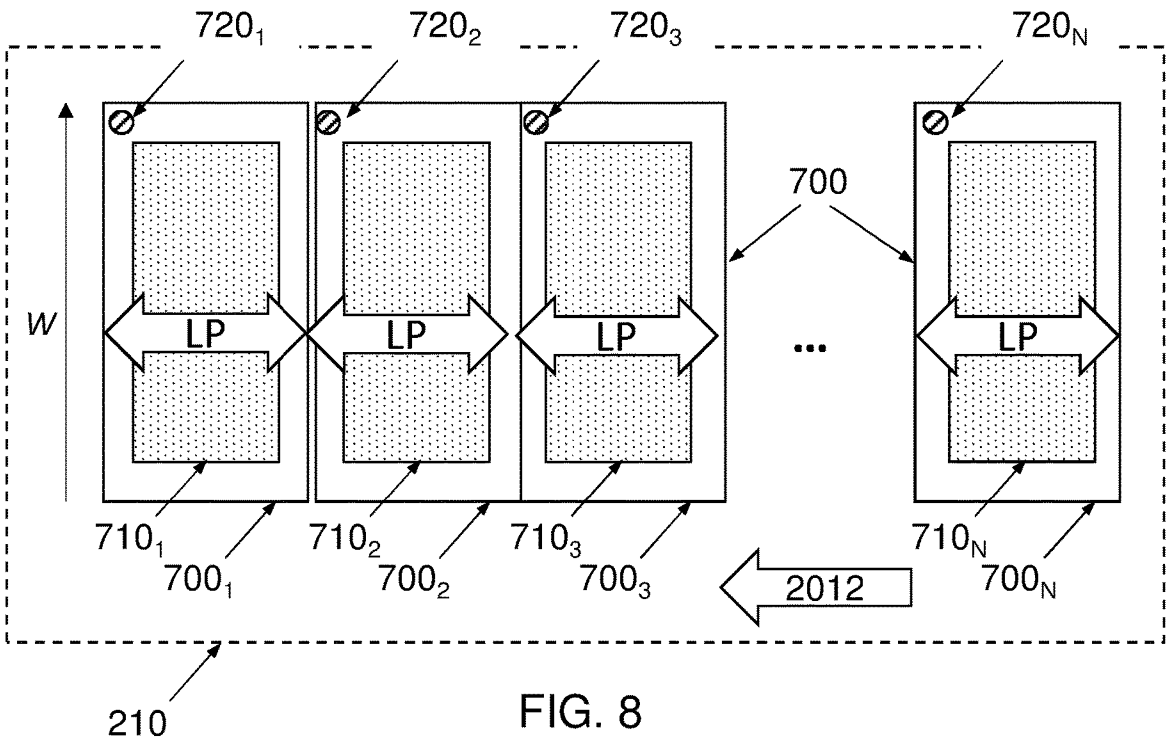
FIGS. 8 and 9 contain alternative plan-view schematic illustrations of an intermediate transfer member (ITM) according to embodiments.

Referring now to FIG. 8, an ITM 210 can be defined by a length measured in the print direction (the print direction is shown as arrow 2012) and a width in the W direction; since this drawing is a plan view, the print direction 2012 and the W direction together define a plane. In examples in which the ITM 210 comprises an endless belt that rotates through a printing system, then its length is equal to the circumference, or alternatively the length is equal to the length of the material that had its two ends joined, for example in a seam, in order to form the endless belt. According to some embodiments, the ITM 210 comprises a plurality of ITM panels 700, each of which has substantially the same width as the ITM 210 and a panel length LP that is greater than zero and less than the length of the ITM. In some embodiments, an ITM panel is a physically demarcated portion of an ITM, for example demarcated by means of markings on the ITM or by grooves or other mechanical modifications in the ITM. In other embodiments, an ITM panel is a virtual (meaning not physically demarcated) portion of an ITM, whose dimensions are stored in a computer system.

Figure 9:
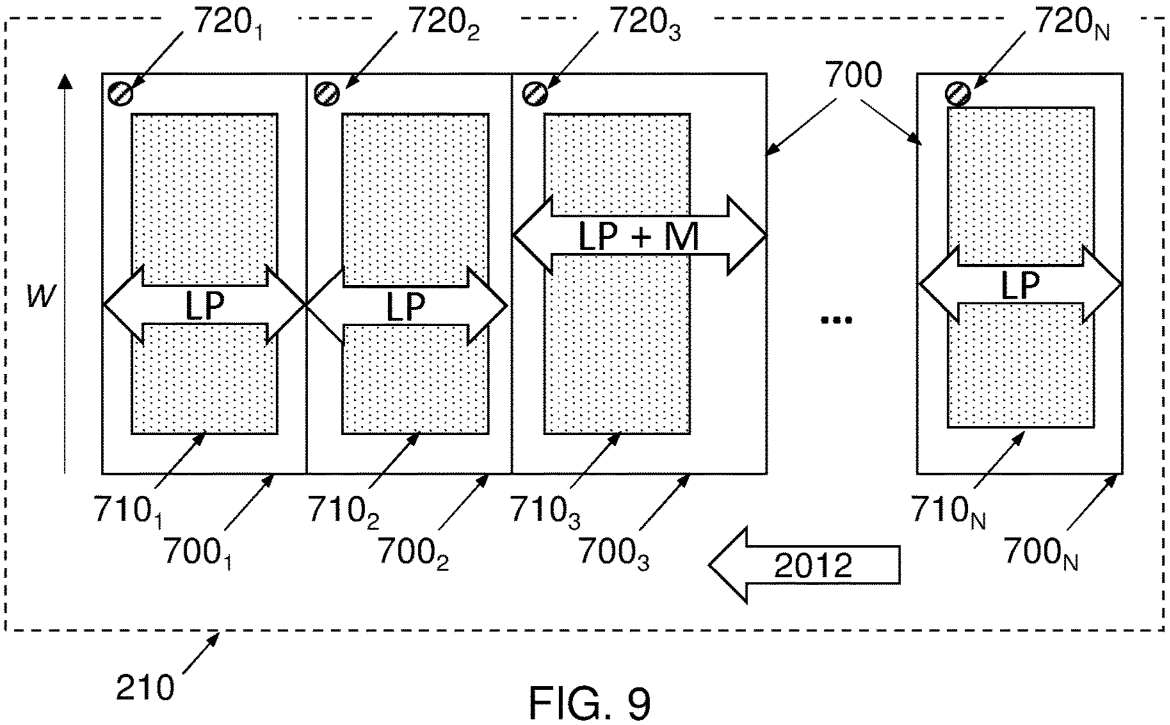

An ITM 210 can comprise any number of ITM panels, and the number of ITM panels may be selected in accordance with a specific design and size of a printing system. For example, an ITM 210 can comprise N panels $\mathbf{700}_1$, $\mathbf{700}_2$, $\mathbf{700}_3$, . . . $\mathbf{700}_N$. In some embodiments, each of the panels has the same panel length LP, as in the example illustrated in FIG. 8, and the length of the ITM 210 is an integer multiple of LP. Since the example in FIG. 8 comprises N panels of length LP, the total length of the ITM in that example is therefore equal to N×LP. In other embodiments, the panels can have different lengths. In the example illustrated in FIG. 9, all of the panels except one have a length LP, and the panel $\mathbf{700}_3$ has a length of LP+M, where M is any positive number.

An ITM panel 700 comprises an ink-image area 710, which is the area of an ITM panel on which an ink image is regularly formed on each pass of the panel through the image-forming station 212. For example, ITM panel $\mathbf{700}_1$ comprises ink-image area $\mathbf{710}_1$, ITM panel $\mathbf{700}_2$ comprises ink-image area $\mathbf{710}_2$, and so on up to N panels and N respective ink-image areas.

In some embodiments, an ITM panel 700 comprises a locator 720, used in locating ITM panels 700 relative to other components of a printing system 100. A locator 720 comprises one of a marker and an input device. A marker can be an optical marker, a magnetic marker, a mechanical marker or an electronic marker such as, for example, a radio frequency identification device (RFID). An input device can be a sensor or detector, for example a detector configured to detect a marker and/or to receive data communications from a marker. In some embodiments, each ITM panel comprises a marker as a locator 720, and in those embodiments a fixed locator 810 (discussed below with reference to FIG. 10) comprising an input device fixedly installed elsewhere in the printing system 100 is configured to detect markers and thereby determine and/or track the location of markers and panels at any time as they travel the ITM rotation path. In other embodiments, each ITM panel 700 comprises an input device such as a sensor or marker-detector as a locator 720, and it is preferably configured to detect one or more fixed locators 810 comprising markers installed elsewhere in the printing system, and thereby determine and/or track the location of input devices and panels at any time as they (locators 720 comprising input devices, and respective ITM panels 700) travel the ITM rotation path. The tracking of ITM panels relative to fixed locations in the printing system can be useful for controlling some of the operations functions of the system, such as ensuring that ink images are formed in the desired sections of the ITM, for example, that the ink images are formed in the ink-image areas where ink images have been previously formed. The tracking of ITM panels and their respective locators relative to fixed locations can be useful for determining parameters such as the rotation speed of the ITM or the location of any specific panel or section or locator of the ITM at any time, and the prediction of such a location based on the rotation speed. The tracking can also be useful for avoiding the forming of ink images on sections of the ITM where it is not desirable, such as outside the ink-image areas or on a seam. The tracking can be useful in connection with embodiments disclosed herein for controlling a blade-replacement mechanism to ensure that blade-replacement operations are not carried out when a section of the ITM that includes either an ink-image area or a seam is traversing an excess-removal location, or alternatively for controlling a blade-replacement mechanism to ensure that blade-replacement operations are carried out only when a section not containing an ink-image area or a seam is traversing an excess-removal location, or alternatively for controlling a blade-replacement mechanism to ensure that blade-replacement operations are carried out only when a specific section is traversing an excess-removal location.

Figure 10:
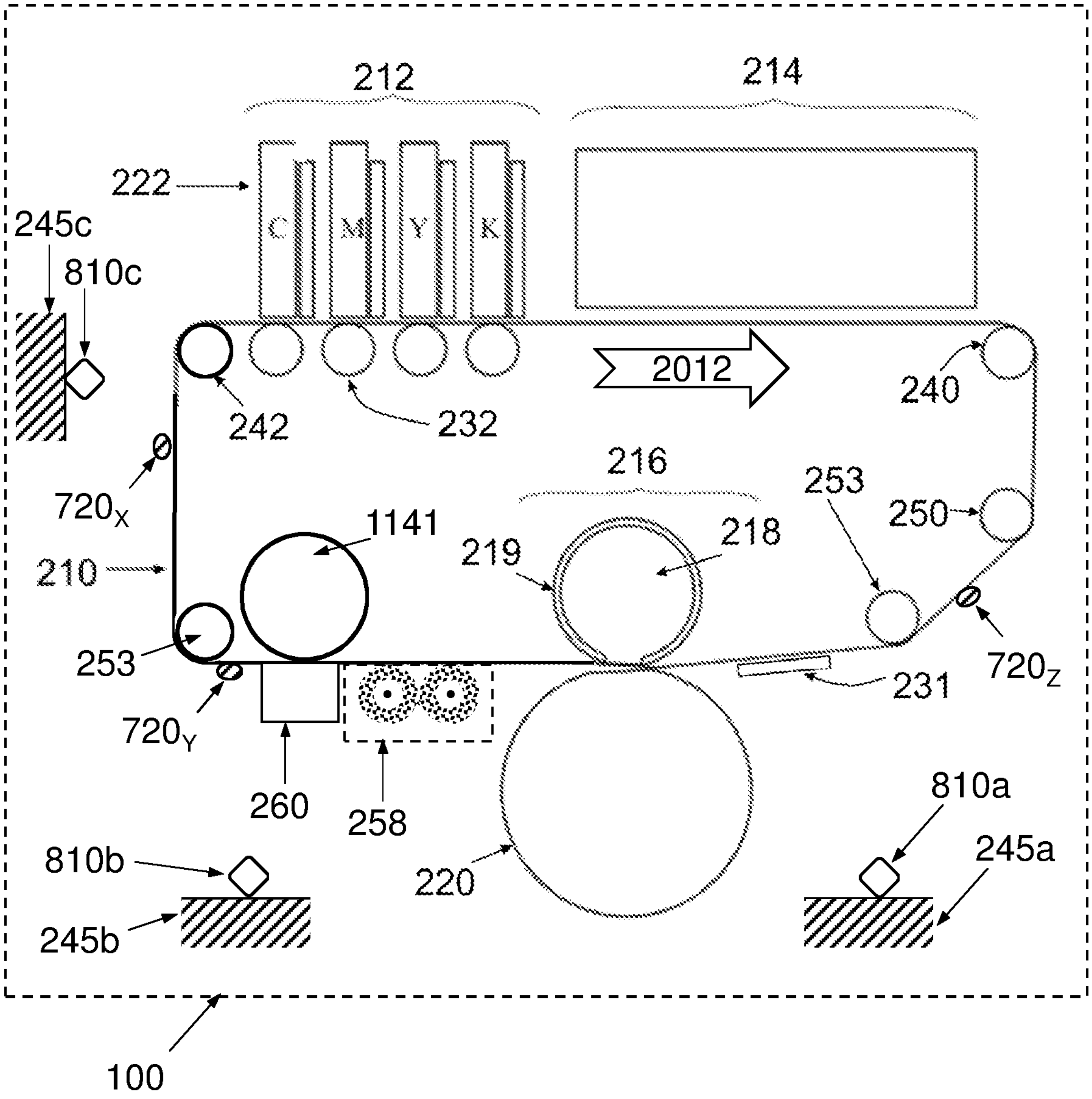
FIG. 10 is an elevation-view illustration of a printing system comprising locators and fixed locators according to embodiments.

FIG. 10 illustrates an example of a printing system 100 comprising locators 720 in or on ITM panels 700 and corresponding fixed locators 810 installed elsewhere in the printing system 100. Examples of locators 720 shown in the drawing are locators $\mathbf{720}_X$, $\mathbf{720}_Y$ and $\mathbf{720}_Z$, all of which are installed in or on the ITM 210. Examples of fixed locators 810 shown in the drawing are fixed locators $\mathbf{810}_A$, $\mathbf{810}_E$ and $\mathbf{810}_C$, each of which is mounted by suitable means to a rigid frame element $\mathbf{245}_A$, $\mathbf{245}_B$ and $\mathbf{245}_C$, respectively, which are, in a non-limiting example, fixed frame elements of the printing system 100. Of course, any number of locators 720 can be provided, and any number of fixed locators 810 can be provided. As discussed earlier, any of locators 720 can be a marker or an input device, and any of fixed locators 810 can be a marker or an input device, with the principle being that fixed markers will be in communication with input devices that move with the rotation of the ITM, and input devices will be in communication with markers that move with the rotation of the ITM. Communication between markers and input devices can be optical, magnetic, electronic including RFID, and/or mechanical.

Figure 11:
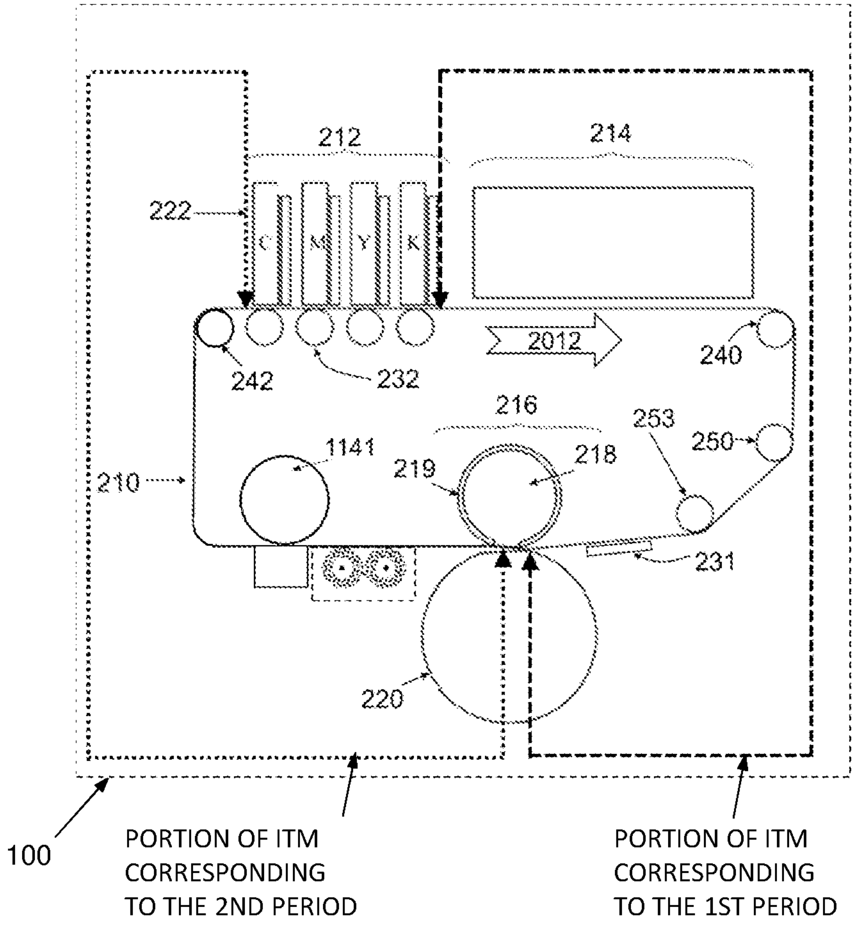
FIG. 11 is an elevation-view illustration of a printing system according to embodiments.

The rotation of an ITM panel 700 through the ITM rotation path can include at least two periods of time in a single printing cycle. During a first period, an ink-image area 710 comprises an ink image 711 (NOT SHOWN because each ink image 711 is coterminous with a respective ink-image area 710). As shown in FIG. 11, the first period corresponds to the traversal by an ITM panel 700 of the portion of the ITM rotation path beginning from the image-forming station 212 where an ink image 711 is formed on an ITM panel 700, and ending at an impression station 216 where the ink image 711 is transferred to substrate. A second period corresponds to the traversal by the ITM panel of the remainder of the ITM rotation path, i.e., the portion of the ITM rotation path beginning from after the impression station 216 at which the ink image 711 is transferred to substrate and ending before the printing station 212. During the second period, an ink-image area 710 contains no ink images 711, although an ink image 711 is regularly formed on the ink-image area 710 on every pass of the ink-image area (and respective ITM panel) through the image-forming station 212, and specifically will be formed as soon as the ink-image area 711 again passes the image-forming station 212.

Figure 12:
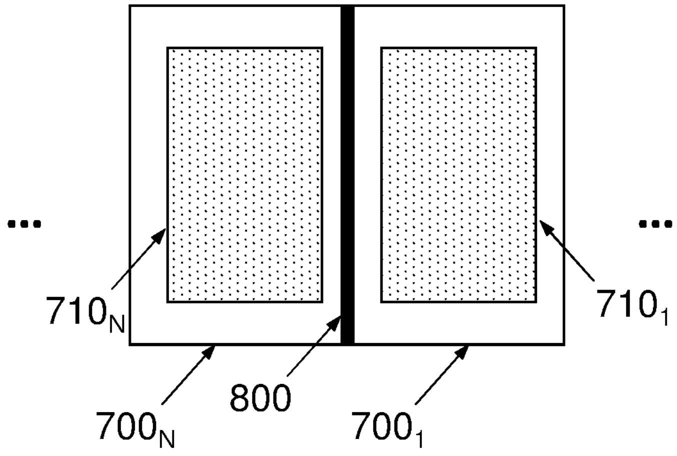
FIG. 12 is a plan-view schematic illustration of ITM panels and a seam according to embodiments.

FIG. 12 shows a seam 800 disposed between two adjacent ITM panels $\mathbf{700}_N$, $\mathbf{700}_1$, the respective subscripts indicating that the seam 800 is placed between the last (Nth) and 1st panels in this non-limiting example. The composition of seams 800, and methods for creating or installing them in or on an ITM 210, were discussed above.

It can be desirable to avoid performing a blade-replacement operation as described above when a 'sensitive' section of an ITM is traversing the excess-removal location. The forces of the blade-replacement operation can put extra stress on the section of ITM passing over the tip of a doctor blade that is held in the active position, and can reduce the quality of the treatment formulation layer applied to the ITM (e.g. its uniformity, desired thickness, etc.), and therefore movement of the blades into and out of the active position should preferably take place when a sensitive section is not present. It should be noted that a blade-replacement operation is preferably performed very rapidly, for example in less than 100 milliseconds, in less than 50 milliseconds, or in less than 10 milliseconds, and this means that the blades are subjected to high acceleration and therefore high forces that can mechanically affect sensitive sections of the ITM with which the blades physically interact. An example of a sensitive section is a section that includes an ink-image area. Because ink-image areas are used repeatedly for formation of ink images thereupon, and because this usage entails not only the formation of ink images but also the transfer of images to substrate at an impression station where strong mechanical forces can be applied to effect the transfer, then the section including an ink-image area can be thinner, be more worn, exhibit material fatigue, or otherwise be less robust in terms of mechanical resistance to forces applied dynamically to its surface by a blade-replacement operation. In addition, the dynamic stress forces of a blade-replacement operation can have a deleterious effect on the future usefulness of a section of ITM that passes the active area during a blade-replacement operation, and thereby make the section less suitable mechanically in the future for repeated printing operations that including repeated ink image formation and repeated transfer to substrate by means of impressions at an impression station. The ITM could get stretched, thinned, frayed or otherwise damaged by experiencing repeated blade-replacement operations, and subsequently have a surface less conducive to being printed upon, or even have a shortened operational lifespan and require replacement sooner than it would otherwise have required. Moreover, it can be particularly important that the treatment formulation be as uniform as possible and as close as possible to the desired thickness specifically in the ink-image area, and, as noted earlier, the blade-replacement operation can locally affect the thickness and uniformity of the treatment formulation on the section of the ITM traversing the treatment station at the time of a blade-replacement operation. Another example of a sensitive section is a section that includes a seam. A seam subjected, whether once or repeatedly, to the stress forces of a blade-replacement operation may be weakened, or may rupture or fray or even be destroyed and rendered useless for further operation. Therefore, in some embodiments it may be desirable to control the occurrence of blade-replacement operations so as to avoid performing them during traversal by such sensitive ITM sections of the excess-removal location. In some embodiments, it may be desirable to control the occurrence of blade-replacement operations so as to ensure that they are performed only when non-sensitive sections of the ITM traverse the excess-removal location. In some embodiments, it may be desirable to control the occurrence of blade-replacement operations so as to ensure that they are performed only when a specific non-sensitive section of the ITM traverses the excess-removal location. There can be other sensitive sections in an ITM other than sections that include ink-image areas or seams, but for purposes of clarity only those two examples are used herein to explain the concept of sensitive sections. In some embodiments, it can be desirable to control the occurrence of blade-replacement so as to perform blade-replacement operations based on the timing of ink-image forming on the ITM. In some embodiments, it can be desirable to control the occurrence of blade-replacement so as to perform blade-replacement operations based on the timing of ink-image transfers from the ITM to the substrate.

Figure 13A:
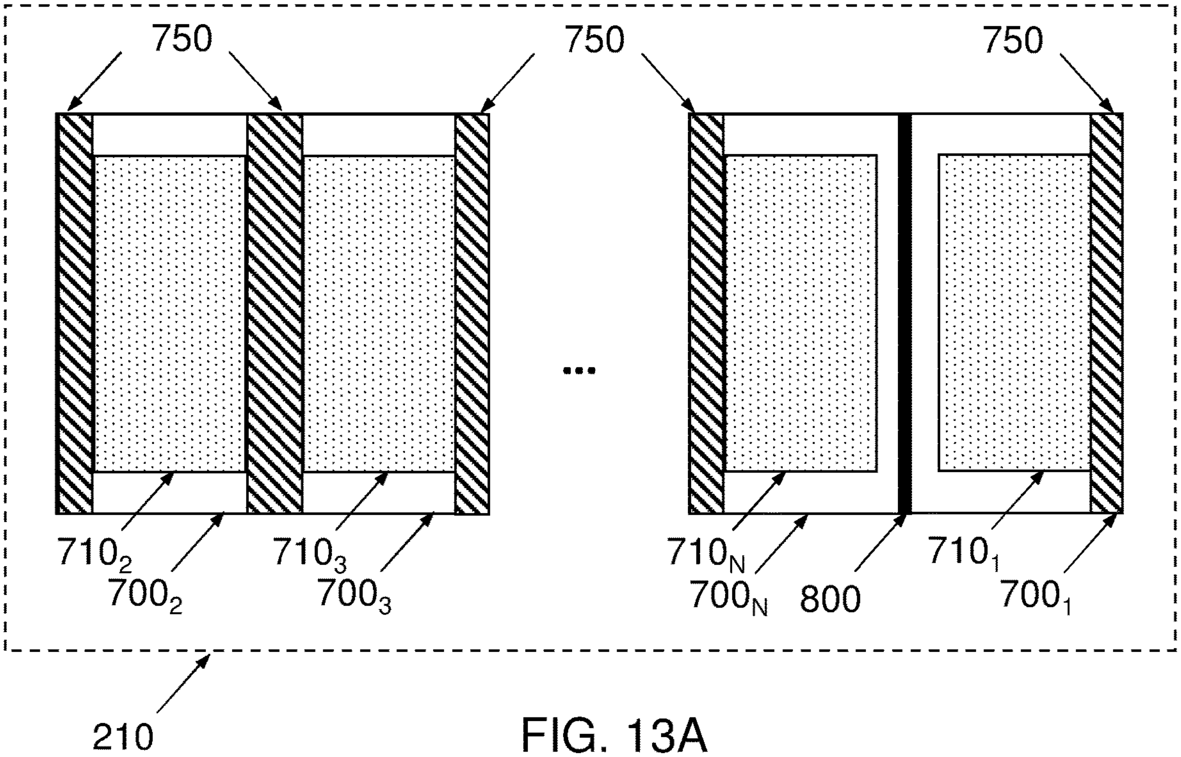
FIGS. 13A, 13B, 14 and 15 contain alternative plan-view schematic illustrations of an intermediate transfer member (ITM) according to embodiments.

Referring to FIG. 13A, an ITM 210 according to embodiments comprises a plurality of sections 750 which include areas between neighboring ink-image areas 710, but don't include any ink-image-areas 710 or parts thereof, or areas that comprise seams 800. These sections 750 exclude what was referred to earlier as sensitive areas, and in some preferred embodiments blade-replacement operations are performed only when one of these sections 750 traverses the excess-removal location. In alternative embodiments, there might be a section 750 interposed in the area between ink-image area 701N and the seam 800, and/or between the seam 800 and ink-image area $\mathbf{701}_1$; that design choice will depend on the amount of space available in either of those two areas (and especially the component of length in the print direction), and the rotation speed of the ITM 210, which together would define whether there would be enough time to allow for a blade-replacement operation between the traversal of the after ink-image area $\mathbf{710}_N$ and the traversal of the seam 800, or between the traversal of the seam 800 and the traversal of ink-image area $\mathbf{701}_1$, respectively. In embodiments in which blade-replacement operations are performed only when of these sections 750 traverses the excess-removal location, a blade-replacement controller, such as blade-replacement controller 1150, which was discussed earlier, includes a processor that executes program instructions which limit blade-replacement operations to those periods of time in which one of these sections 750 traverses the excess-removal location.

Figure 13B:
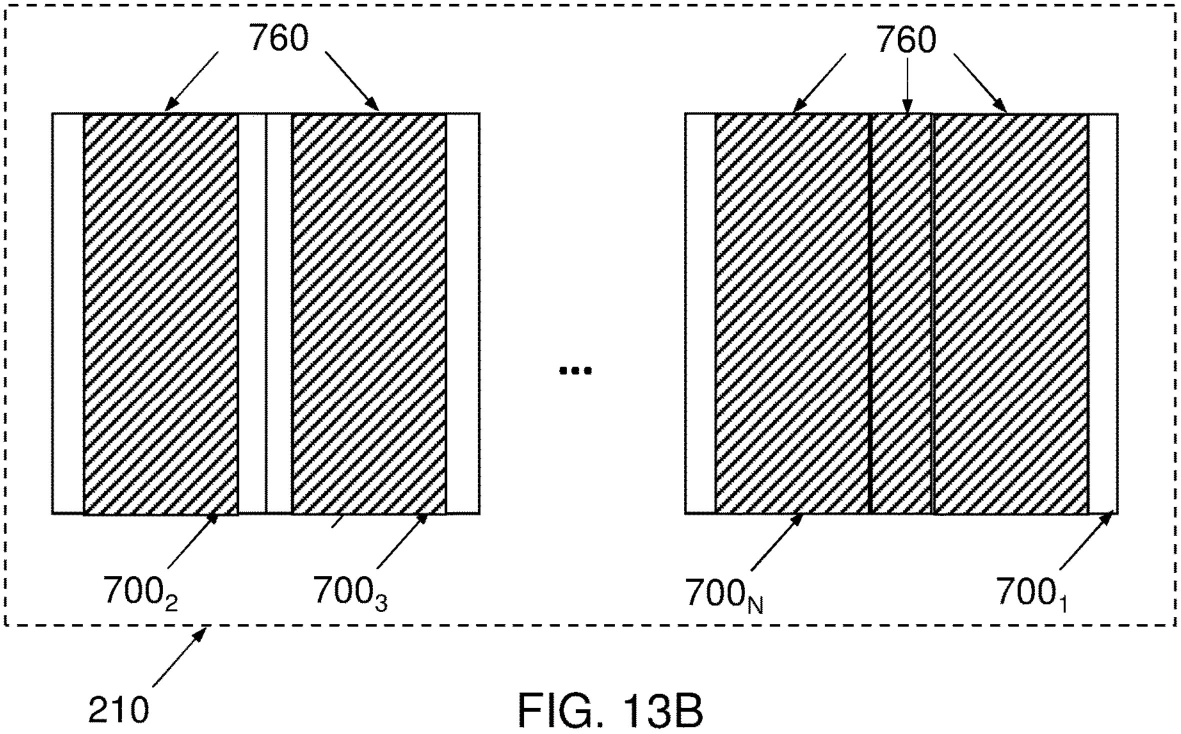

In FIG. 13B, an ITM 210 according to embodiments comprises a plurality of sections 760 which include ink-image areas 710 and seams 800. These sections 760 include what was referred to earlier as sensitive areas, and in some preferred embodiments blade-replacement operations are not performed when one of these sections 760 traverses the excess-removal location. In alternative embodiments, a section 760 that is shown in the area between ink-image area 701N and ink-image area $\mathbf{701}_1$ might be smaller and cover only the seam 800; that design choice will depend on the amount of space available in either of those two areas (and especially the component of length in the print direction), and the rotation speed of the ITM 210, which together would define whether there would be enough time to allow for a blade-replacement operation between the traversal of the after ink-image area $\mathbf{710}_N$ and the traversal of the seam 800, or between the traversal of the seam 800 and the traversal of ink-image area $\mathbf{701}_1$, respectively. According to embodiments in which blade-replacement operations are performed only when of these sections 760 traverses the excess-removal location, a blade-replacement controller, such as blade-replacement controller 1150, which was discussed earlier, includes a processor that executes program instructions which cause a printing system 100 to avoid performing blade-replacement operations during those periods of time in which one of these sections 760 traverses the excess-removal location.

Figure 14:
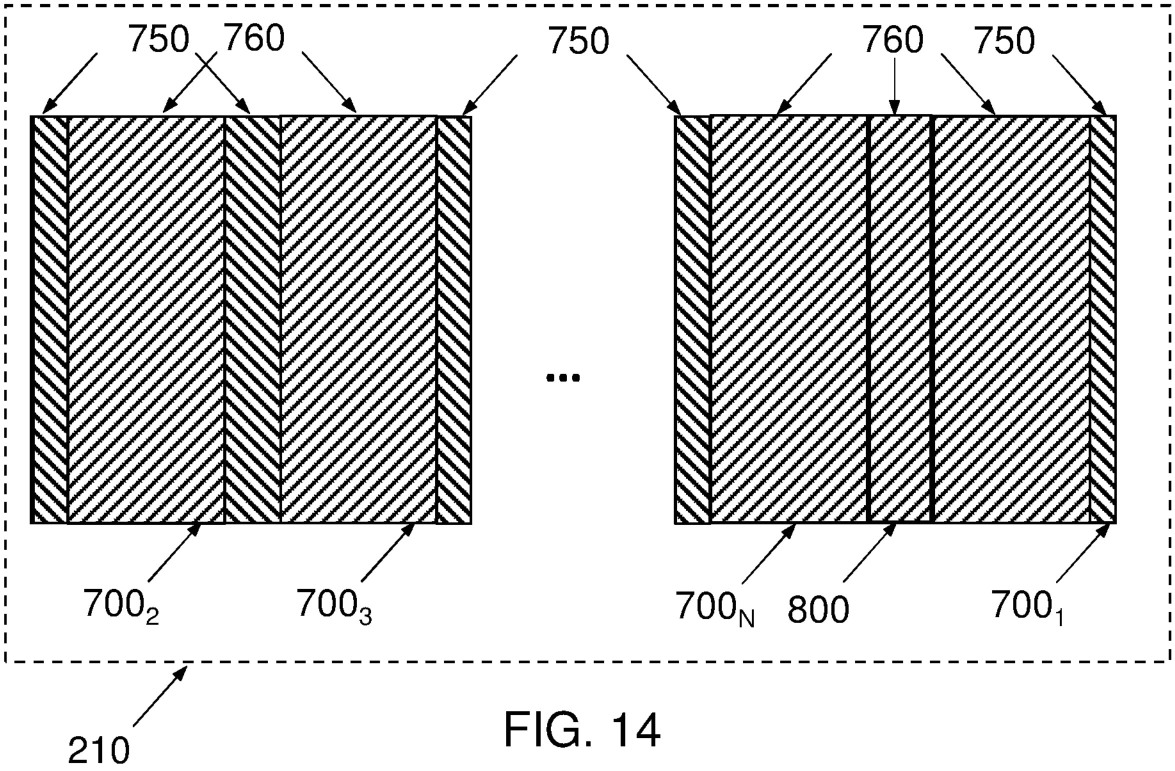

FIG. 14 shows an ITM 210 that comprises a first plurality of sections 750 as described above with reference to FIG. 12A, and a second plurality of sections 760 as described above with reference to FIG. 12B. As can be seen in the drawing, there are no overlaps between the two pluralities of sections 750, 760, and they are mutually exclusive. In addition, it can be seen that the ITM 210 is comprised entirely of the two pluralities of sections 750, 760; there are no sections of the ITM that are neither in the first plurality nor in the second plurality.

Figure 15:
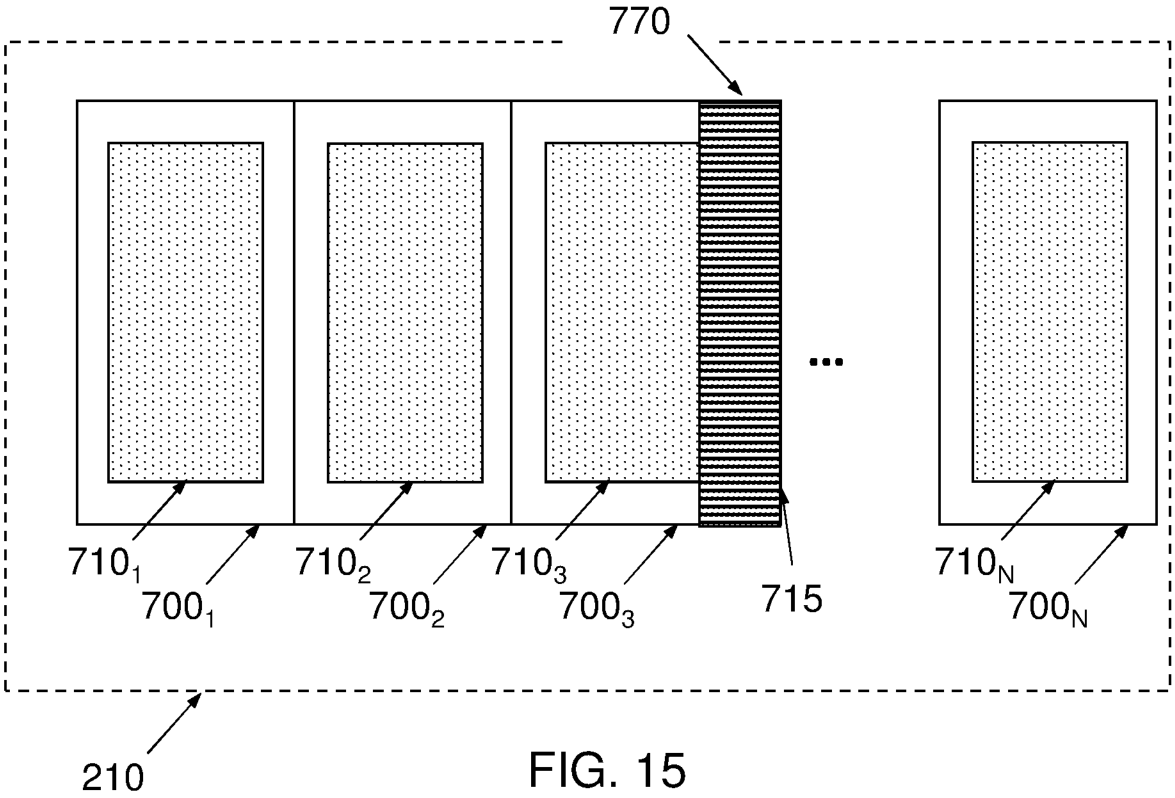

In FIG. 15 an ITM 210 comprises a pre-selected section 770. In some embodiments, the ITM 210 in FIG. 15 is the same ITM 210 in FIG. 9 in which, as previously discussed, one panel $700_3$ has a greater length than the other panels 700, in which case the pre-selected section 770 is preferably co-located with the larger panel, between an ink-image area $710_3$ and an edge 715 of panel $700_3$. The pre-selected section 770 does not include a sensitive section as referred to herein. In embodiments, blade-replacement operations are preferably performed when pre-selected section 770 is traversing the excess-removal location. It will be obvious to the skilled practitioner that the pre-selected section 770 need not be part of the 3rd panel and it can be part of any panel, for example any of the ITM panels $700_1$, $770_2$ or $770_N$ shown. Moreover, it should be obvious that pre-selected section 770 can additionally include part of an adjacent panel 700, up to and not including the ink-image area 710 in the adjacent panel 700, as long as there is no seam 800 between the panel comprising the pre-selected section 770 and said adjacent panel—for example if the drawing were to show panel $770_4$ then the part of panel $770_4$ between panel $770_3$ and ink-image area $710_4$ could be included in pre-selected section 770. It should also be clear that while this figure and the accompanying discussion refer to a non-limiting example in which the pre-selected section 770 is located wholly or partly on a panel 700 with a larger length than other panels, the pre-selected section 770 can be located wholly or partly on any panel 700 so long as it does not overlap a sensitive section as referred to herein. According to embodiments in which blade-replacement operations are performed only when pre-selected section 770 traverses the excess-removal location, a blade-replacement controller, such as blade-replacement controller 1150, which was discussed earlier, includes a processor that executes program instructions which cause a printing system 100 to perform blade-replacement operations only during those periods of time in which pre-selected section 770 traverses the excess-removal location.

ILLUSTRATIVE EXAMPLES OF SYSTEM OPERATION

Example 1

A printing system according to any of the embodiments herein comprises an ITM that includes 11 panels (i.e., N=11) and a seam between Panel 11 and Panel 1 (as illustrated in FIG. 13A which shows a seam between Panel N and Panel 1), each panel comprising an ink-image area, and the printing system additionally comprises a blade-replacement controller programmed to cause a blade-replacement mechanism to perform a blade-replacement operation once during each rotation of the ITM, after the ink-image area on Panel 10 has passed the excess-removal location, and before the ink-image area on Panel 11 passes it, for example the section 750 in Panel N shown in FIG. 13A.

Example 2

A printing system according to any of the embodiments herein comprises an ITM that includes 11 panels and a seam between Panel 11 and Panel 1, each panel comprising an ink-image area, and the printing system additionally comprises a blade-replacement controller programmed to cause a blade-replacement mechanism to enforce a rule whereby a blade-replacement operation is performed exactly once during each rotation of the ITM, in this example after the ink-image area on Panel 11 has passed the excess-removal location, and before the seam passes it.

As discussed earlier, a sensitive section is one that contains, for example, an ink-image area or a seam. In embodiments, a controller uses location and/or speed information to determine when a section not comprising a sensitive section will pass the excess-removal location, and will only initiate a blade-replacement operation on the basis of that determining, thus ensuring that the section traversing the excess-removal location at the time of the blade-replacement operation is one of a plurality of pre-determined sections that do not include a sensitive section. In an embodiment, the method uses a blade-replacement controller that controls the blade-replacement mechanism to ensure that blade-replacement operations are only performed when one of a plurality of pre-determined sections of the ITM, for example the sections 750 of FIG. 13A, traverses the excess-removal location. In alternative embodiments, the controller uses location and/or speed information to determine when a section comprising a sensitive section will pass the excess-removal location, and will initiate a blade-replacement operation on the basis of that determining, specifically avoiding a situation where the section traversing the excess-removal location at the time of the blade-replacement operation is one of a plurality of pre-determined sections that includes a sensitive section. In an embodiment, the method uses a blade-replacement controller that controls the blade-replacement mechanism to avoid having blade-replacement operations performed when one of a plurality of pre-determined sections of the ITM, for example the sections 760 of FIG. 13A, traverses the excess-removal location.

In embodiments, such as those which will be discussed with reference to FIG. 16, a blade-replacement controller 1150 can comprise program instructions that cause it to ensure that a blade-replacement operation is carried out only when a section not comprising a sensitive section passes the excess-removal location. In alternative embodiments, such as those which will be discussed with reference to FIG. 17, a blade-replacement controller 1150 can comprise program instructions that cause it to avoid performing a blade-replacement operation when a section comprising a sensitive section passes the excess-removal location.

Figure 16:
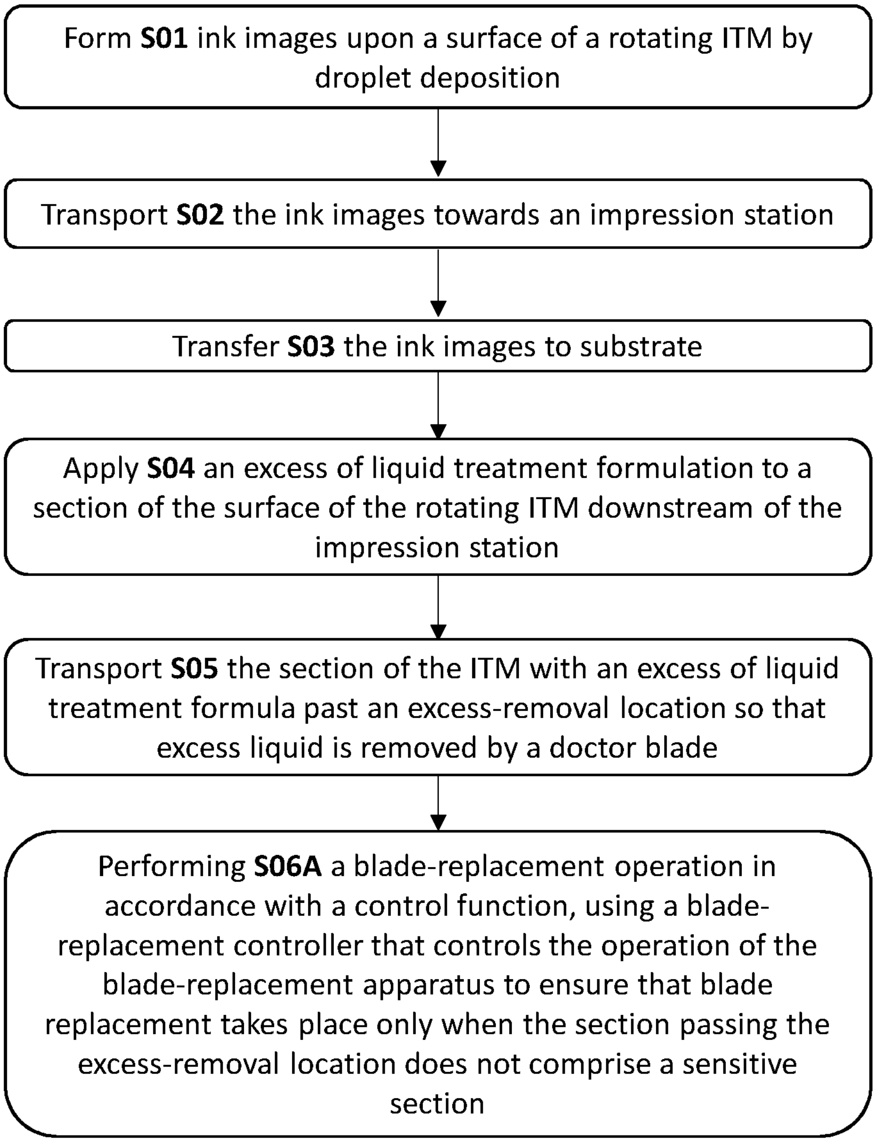
FIG. 16 is a flowchart of a method of operating a printing system that includes a blade-replacement mechanism and a blade-replacement controller according to embodiments.

FIG. 16 contains a flowchart of a method, according to some embodiments, of operating a printing system which includes a blade-replacement mechanism and a blade-replacement controller, wherein the method comprises:

a) Step S01 forming ink images upon a surface of a rotating ITM 210 by droplet deposition;
b) Step S02 transporting the ink images towards an impression station;
c) Step S03 transferring the ink images to substrate;
d) Step S04 applying an excess of liquid treatment formula to a section of the surface of the rotating ITM downstream of the impression station;
e) Step S05 transporting the section of the ITM with an excess of liquid treatment formulation past an excess-removal location, where the presence of a doctor blade in the active position causes excess liquid to be removed, leaving a treatment solution film with predetermined properties such as thickness and uniformity of thickness; and
f) Step S06A performing a blade-replacement operation in accordance with a control function. The control function is preferably accomplished by a blade-replacement controller that controls the operation of a blade-replacement mechanism to ensure that replacement of a blade in the active position with a different blade takes place only when the section of the ITM being transported past the excess-removal location does not include a sensitive section.

In other embodiments, Step S06A comprises controlling the operation of the blade-replacement mechanism to ensure that replacement of a blade in the active position with a different blade takes place only when the section of the ITM being transported past the excess-removal location is one of a plurality of pre-determined 'permissible' sections of the ITM, i.e., they are pre-determined as permissible for blade-replacement operations. Examples of pre-determined 'permissible' sections include the sections 750 in FIG. 13A.

Figure 17:
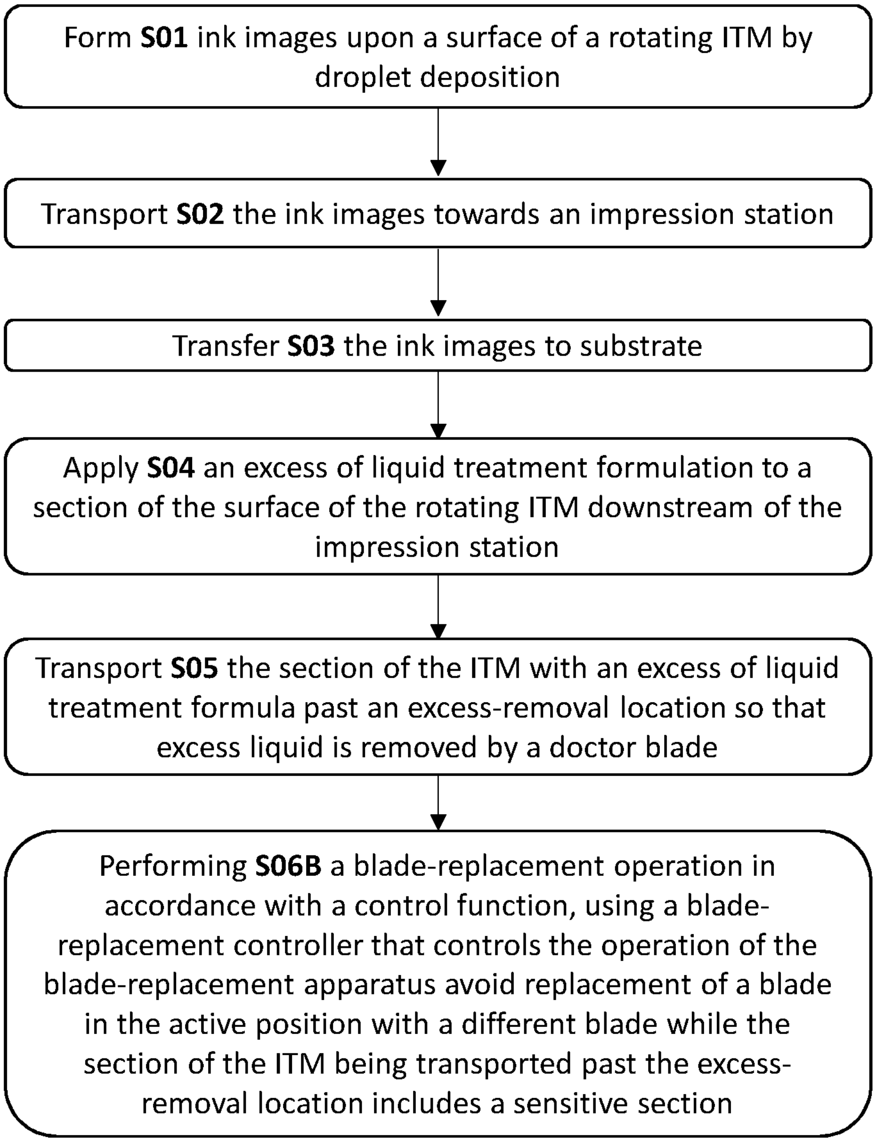
FIG. 17 is a flowchart of a method of operating a printing system that includes a blade-replacement mechanism and a blade-replacement controller, according to an alternative embodiment.

FIG. 17 contains a flowchart of a method, according to alternative embodiments, of operating a printing system which includes a blade-replacement mechanism and a blade-replacement controller, wherein the method comprises Steps S01, S02, S03, S04 and S05, all of which are the same as for the method whose flowchart was illustrated in FIG. 16, and Step S06B performing a blade-replacement operation in accordance with a control function. The control function is preferably accomplished by a blade-replacement controller that controls the operation of a blade-replacement mechanism avoid replacement of a blade in the active position with a different blade while the section of the ITM being transported past the excess-removal location includes a sensitive section.

In other alternative embodiments, Step S06B comprises controlling the operation of the blade-replacement mechanism to avoid replacement of a blade in the active position with a different blade while the section of the ITM being transported past the excess-removal location is one of a plurality of pre-determined 'non-permissible' sections of the ITM, i.e., they are pre-determined as being non-permissible for blade-replacement operations. Examples of pre-determined 'non-permissible' sections include the sections 760 in FIG. 13B.

In some embodiments, not all steps of the method are necessary.

Examples of suitable apparatus for carrying out Steps S01, S02, S03, S04 and S05 have been described with reference to FIGS. 1, 2A and 2B. An example of suitable apparatus for carrying out either Step S06A or Step S06B is blade-replacement controller 1150 of FIG. 6, together with a blade-replacement mechanism such as, for example, motor 1140 of FIG. 6.

Figure 18:
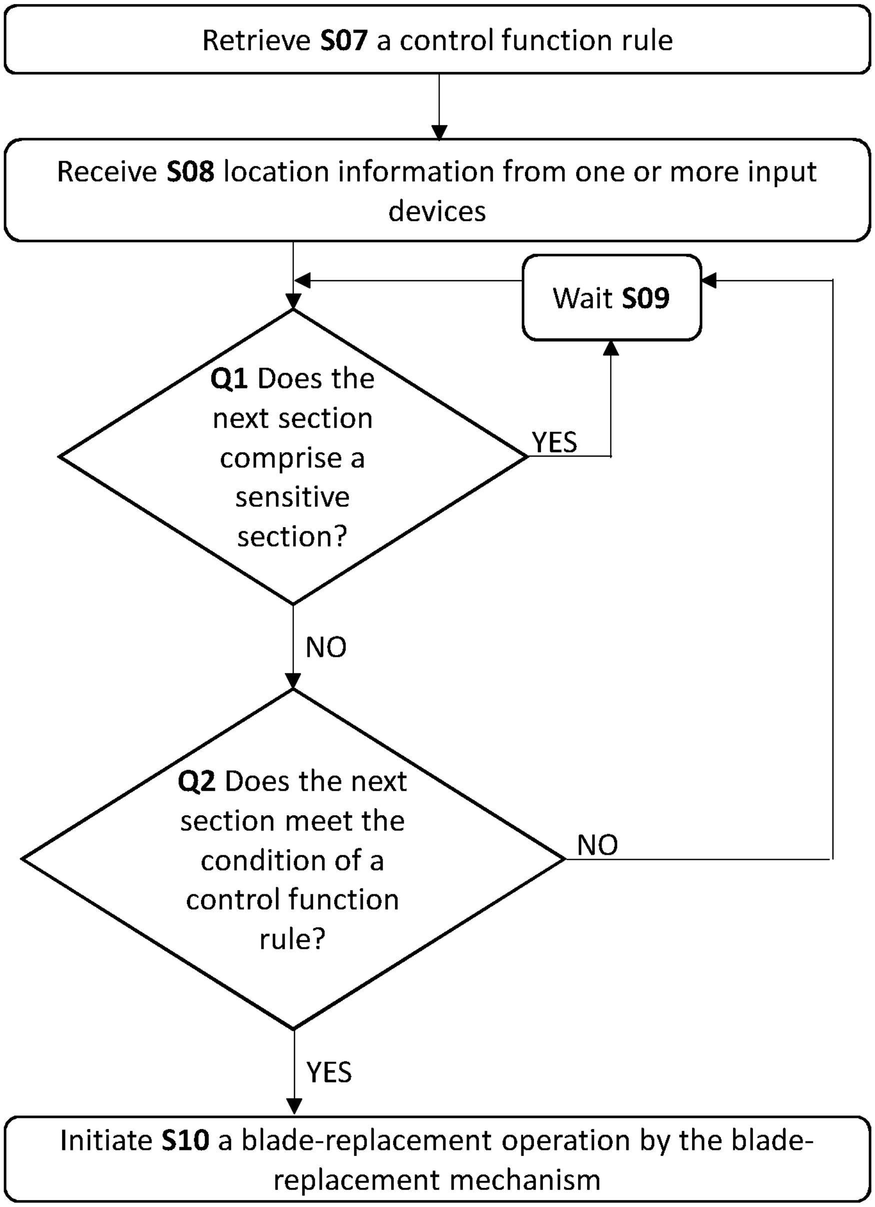
FIG. 18 is a flowchart of a method for performing a blade-replacement operation in accordance with a control function, according to embodiments.

In embodiments, either one of Step S06A or Step S06B can suitably be carried out by practicing a method for performing a blade-replacement operation in accordance with a control function, such as the method illustrated in the flowchart in FIG. 18, the method comprising:

a) Step S07 retrieving a control function rule from computer storage. A non-exhaustive list of examples of control function rules includes:
   i. Perform a blade-replacement operation after each X rotations of the ITM
   ii. Perform a blade-replacement operation after each Y seconds
   iii. Perform a blade-replacement operation after each Z sheets (in a sheet-fed press)
   iv. Perform a blade-replacement operation after each XX images (XX can be e.g., a number of ink images deposited on the ITM or a number of ink images transferred to substrate), where X, Y, Z, and XX are all parameters whose values can be determined in advance by a designer and stored in computer storage for later retrieval by a controller, or, alternatively, included in the program instructions of a controller.
b) Step S08 receiving, by the blade controller, location information and or ITM rotation speed information from one or more input devices such as, for example, input devices serving as locators 720 or fixed locators 810, as discussed above;
c) Decision Q1 whether the next section of the ITM that will pass the excess-removal section comprises a sensitive section, the decision being made by the blade-replacement controller, for example using location information and/or ITM rotation speed information received from the one or more input devices. If the answer is 'YES' then Step S09 is carried out, which entails waiting for the following ITM section and revisiting Q1 with respect to that following section. If the answer is 'NO', then Decision Q2 is addressed.
d) Decision Q2 whether the next section of the ITM meets the condition of a control function rule. For example, if Rule (i), "Perform a blade-replacement operation after each X rotations of the ITM", was retrieved in Step S07, then the controller would decide whether the ITM has rotated X times since the last blade replacement was performed. X can be an integer, for example 1, but in some embodiments is not an integer. If the answer is 'NO' then Step S09 is carried out, which entails waiting for the following section and revisiting Q1 with respect to that following section. If the answer is 'YES', then Step S10 is carried out.
e) Step S10 initiating a blade-replacement operation by the blade-replacement mechanism.

Figure 19:
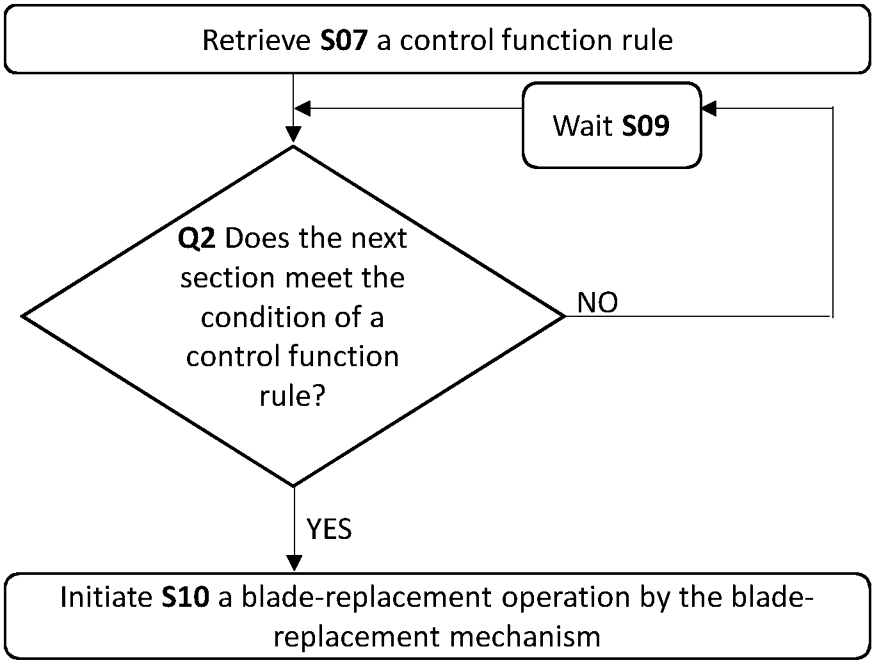
FIG. 19 is a flowchart of another method for performing a blade-replacement operation in accordance with a control function, according to embodiments.

It will be obvious to the skilled practitioner that in some embodiments the retrieving (Step S07) can be skipped, for example: embodiments in which a control function rule is included in a controller's program instructions, or alternatively if a control function rule was retrieved earlier, for example when the printing system was first booted up. It will also be obvious to the skilled practitioner that the order of Decisions Q1 and Q2 can be reversed without changing the effectiveness of the method. In some embodiments, Decision Q1 can be skipped, and in other embodiments both the receiving (Step S08) and Decision Q1 can be skipped. In either of these two cases the initiating (Step S10) can proceed solely on the basis of a 'YES' result from Decision Q2. For the sake of clarity, a flowchart of the method according to an illustrative, non-limiting example of an embodiment, in which (Step S08) and Decision Q1 are both skipped, is included in FIG. 19. In this example, a control function rule can include rule (ii), "Perform a blade-replacement operation after each Y seconds". Initiating (Step S10) can be thus performed solely on the basis of timing, without a need to receive ITM section location information (as in Step S08 in FIG. 18) or to check (as in Decision Q1 in FIG. 18) which ITM section is going to be passing the excess-removal location during a blade-replacement operation, for example if the length and rotation speed of the ITM are known and taken into consideration when determining the duration of the Y-seconds interval for the control function rule.

In other embodiments, Step S08 comprises determining when one of the plurality of pre-determined 'permissible' or 'non-permissible' sections of the ITM will pass the excess-removal location, using the at least one of location information and ITM rotation speed information received from the one or more input devices, and Step S10 comprises causing the blade-replacement operation to perform a blade-replacement operation according to the determining of Step S08.

Markers and input devices such as sensors or marker-detectors installed on an ITM, together with corresponding sensors or marker-detectors, or markers, respectively, installed in a printing system, can track the location of specific portions, sections and/or components of a rotating ITM. In an alternative embodiment, Step S08 comprises receiving location information from one or more such input devices, and the method comprises an additional Step S08.1 (NOT SHOWN) of calculating ITM speed from location information. A controller such as a blade-replacement controller 1150 receives location and, optionally, speed tracking information from input devices.

In embodiments, such as those which will be discussed with reference to FIG. 20, a blade-replacement controller 1150 can comprise program instructions that cause it to ensure that a blade-replacement operation is carried out only when a pre-selected section of the ITM passes the excess-removal location. The pre-selected section is preferably one of the 'permissible' sections. Alternatively or additionally, the pre-selected section does not comprise a sensitive section. By means of illustration, in EXAMPLE 1 above, an embodiment is discussed in which a blade-replacement operation is performed every time that a pre-selected section between the ink image areas in adjacent panels (Panels 10 and 11) passes the excess-removal location.

Figure 20:
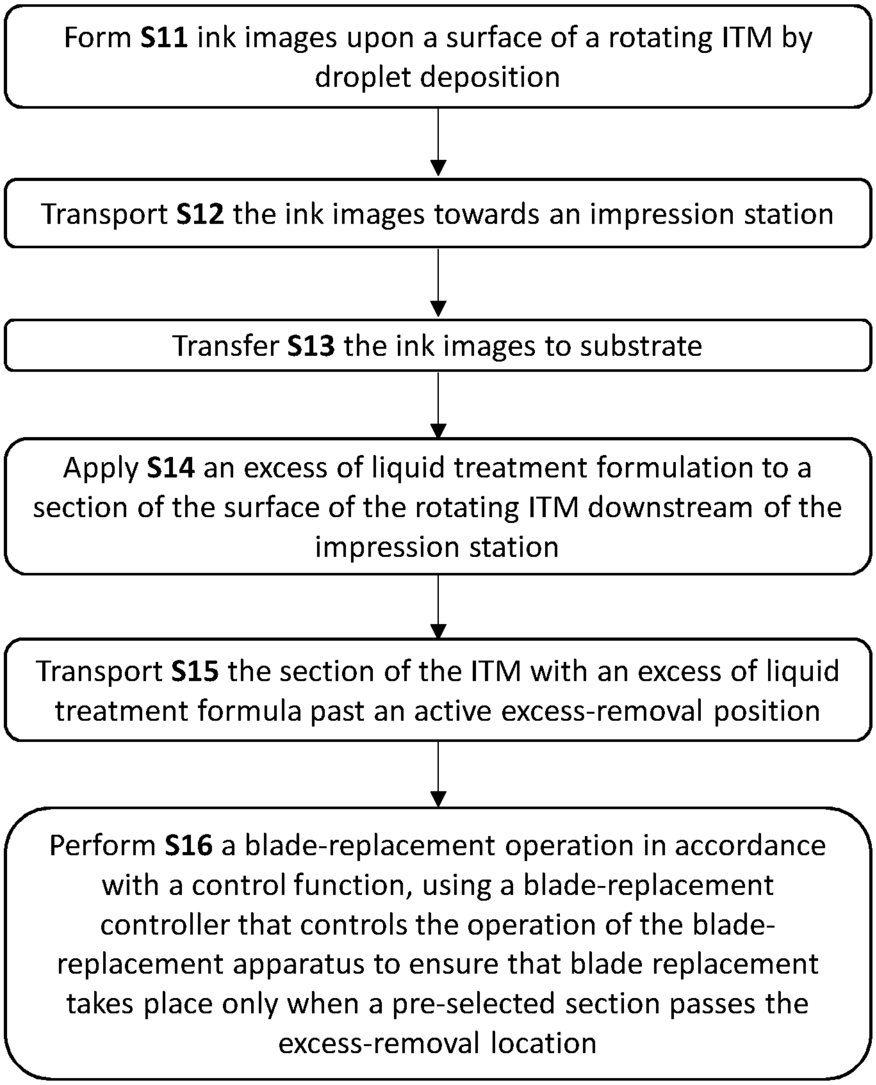
FIG. 20 is a flowchart of another method of operating a printing system that includes a blade-replacement mechanism and a blade-replacement controller, according to embodiments.

FIG. 20 contains a flowchart of a method, according to some embodiments, of operating a printing system which includes a blade-replacement mechanism and a blade-replacement controller, wherein the method comprises:

a) Step S11 forming ink images upon a surface of a rotating ITM 210 by droplet deposition;
b) Step S12 transporting the ink images towards an impression station;
c) Step S13 transferring the ink images to substrate;
d) Step S14 applying an excess of liquid treatment formula to a section of the surface of the rotating ITM downstream of the impression station;
e) Step S15 transporting the section of the ITM with an excess of liquid treatment formulation past an excess-removal location where the presence of a doctor blade in the active position causes excess liquid to be removed; and
f) Step S16 performing a blade-replacement operation in accordance with a control function, using a blade-replacement controller that controls the operation of the blade-replacement mechanism to ensure that blade replacement takes place only when a pre-selected section passes the excess-removal location.

In some embodiments, not all steps of the method are necessary.

Figure 21:
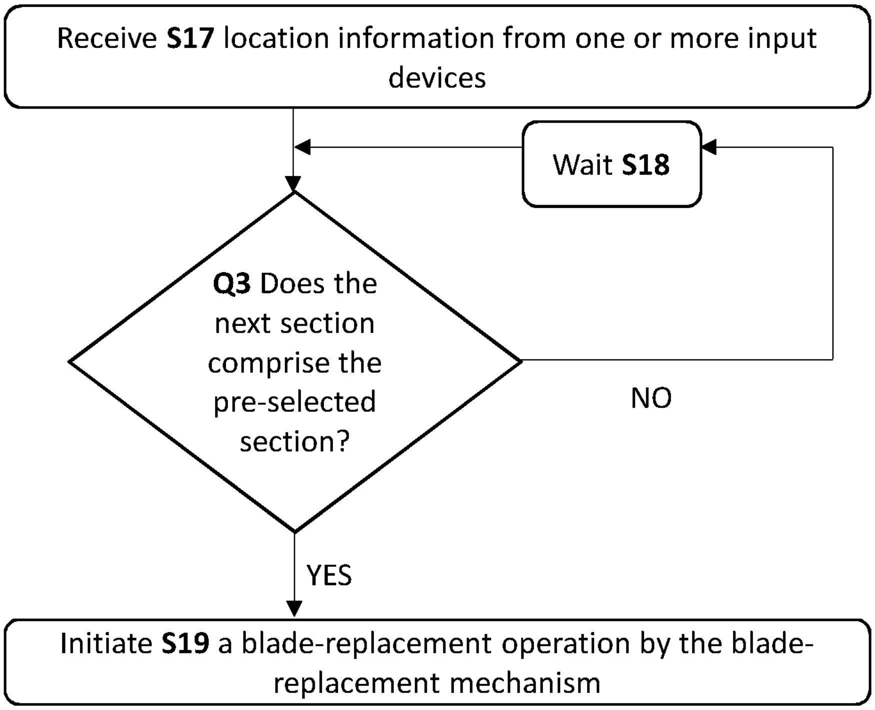
FIG. 21 is a flowchart of another method for performing a blade-replacement operation in accordance with a control function, according to embodiments.

Examples of suitable apparatus for carrying out Steps S11, S12, S13, S14 and S15 have been described with reference to FIGS. 1, 2A and 2B. An example of suitable apparatus for carrying out Step S16 is blade-replacement controller 1150 of FIG. 6. In embodiments, Step S16 can suitably be carried out by practicing a method for practicing a method for performing a blade-replacement operation in accordance with a control function, such as the method illustrated in the flowchart in FIG. 21, the method comprising:

a) Step S17 receiving location information and or ITM rotation speed information from one or more input devices such as, for example, input devices serving as locators 720 or fixed locators 810, as discussed above;
b) Decision Q3 whether the next section of the ITM that will pass the excess-removal section comprises the pre-selected section, the decision being made by the blade-replacement controller, for example using location information and/or ITM rotation speed information received from the one or more input devices. If the answer is 'YES' then Step S18 is carried out, which entails waiting for the following section and revisiting Q3 with respect to that following section. If the answer is 'NO', then Step S19 is carried out.
c) Step S19 initiating a blade-replacement operation by the blade-replacement mechanism.

In an alternative embodiment, Step S17 comprises receiving location information from one or more input devices, and the method comprises an additional Step S17.1 (NOT SHOWN) of calculating ITM speed from location information. A controller such as a blade-replacement controller 1150 receives location and, optionally, speed tracking information from input devices. The controller uses location and/or speed information to determine when the pre-selected section will pass the excess-removal location, and will initiate a blade-replacement operation on the basis of that determining. In an embodiment, the method uses a blade-replacement controller that controls the blade-replacement mechanism to ensure that blade-replacement operations occur only when the specific pre-selected section of the ITM, for example section 770 of FIG. 15, traverses the excess-removal location. In another aspect, the pre-selected section 770 can comprise a pre-selected one of a plurality of pre-determined sections, for example the sections 750 of FIG. 13A.

In embodiments, the blade-replacement controller 1150 is configured to ensure that blade-replacement operations do not occur synchronously with the transfer of an ink image 711 to substrate at an impression station 216. In some embodiments, this ensuring only takes place when the substrate comprises individual sheets.

As discussed earlier the tip 1125 (shown in FIGS. 3 and 6) of the doctor blade 2014 (shown in FIGS. 2C and 3) or the doctor blade 1122 (shown in FIGS. 4 through 7 when the blade 1122 is one of a plurality of blades in a coating thickness-regulator assembly 1120 such as, for example, the revolving cylinder illustrated there) pushes the flexible ITM 210 against the surface backing roller 1141 in order to 'penetrate' or deform the surface backing roller 1141, as illustrated schematically in FIG. 2C. The compressibility of the surface of the backing roller 1141 and/or the extent to which a doctor blade 2014 or 1122 causes the penetration or deformation of the surface of the backing roller 1141 is used as a factor, in some embodiments, in regulating the thickness of the treatment solution 2030 on the surface of the ITM 210. The force applied between the doctor blade and the backing roller with the ITM 210 between the two (for example force F1 shown in FIGS. 6 and 7), regardless of whether it is applied from the direction of the doctor blade 2014 or 1122 or from the direction of the backing 1141 roller, helps to make the interaction between the blade and the ITM 210 effective in removing the excess liquid 2030 from the surface of the ITM 210. The term 'interaction' as used jointly in connection with a blade and an ITM, is used herein to mean the ITM 210 traversing a blade, and/or any or all physical phenomena resulting therefrom.

Local stretching of the ITM 210 can be caused by several factors or their combination. In a non-limiting example, the interaction between a doctor blade and the ITM can cause a local and/or non-uniform stretching of the ITM. This can occur because of the force F1 applied, or because of a frictional force between the ITM one the one hand and the doctor blade and/or the backing roller on the other hand, or a combination of the force F1 and the frictional force.

Figure 22A:
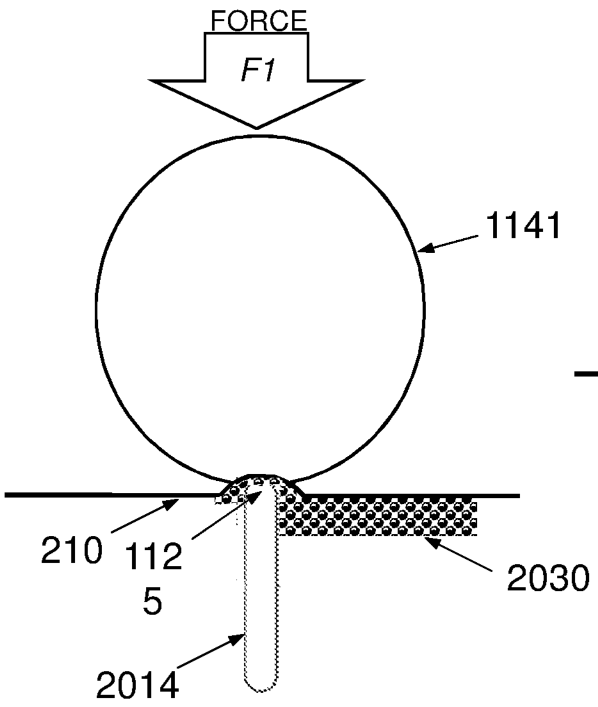
FIGS. 22A, 22B and 22C are schematic illustrations of physical forces affecting the interaction between a doctor blade and an ITM according to embodiments.
Figure 22B:
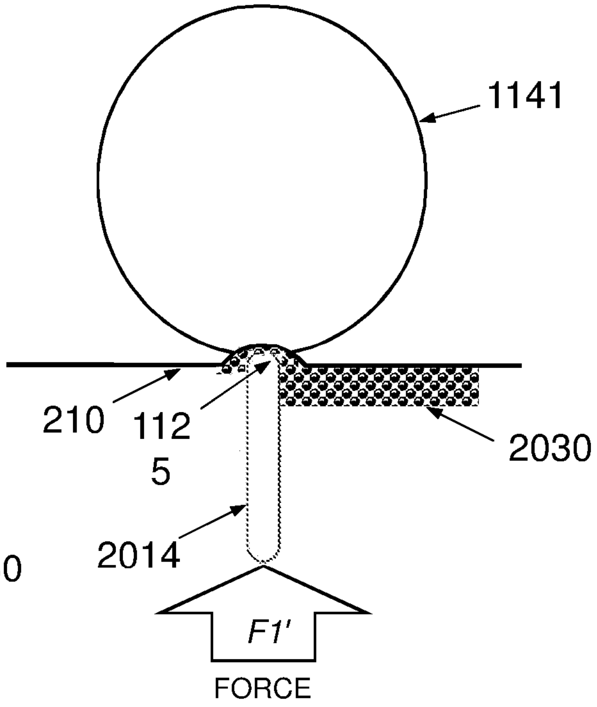
Figure 22C:
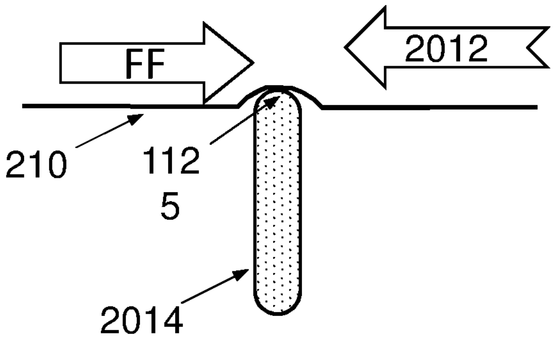

FIG. 22A illustrates a force F1 according to an example in which the force is applied from the direction of the backing roller 1141. FIG. 22B illustrates a force F1' equal in magnitude to force F1 but in the opposite direction, i.e., when applied from the direction of the doctor blade 2014. FIG. 22C schematically illustrates a force FF due to friction between the ITM 210 and the blade 2014, shown here as being opposite to the direction of travel of the ITM 210 (the print direction shown as arrow 2012).

Figure 22D:
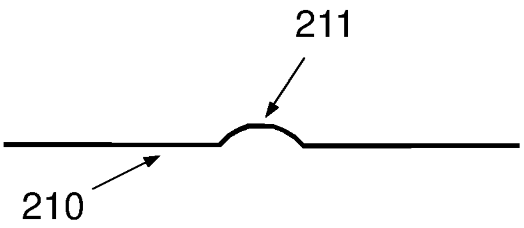
FIG. 22D is a schematic illustration of a section of ITM with a non-uniform stretching caused by the interaction of the blade with the surface of the ITM according to embodiments.

As shown in FIG. 22D, the forces illustrated in FIGS. 22A, 22B and 22C, whether singly or in combination, or in combination with other factors, can cause stretching of the ITM 210 proximate to the point at which the surface of the ITM 210 traverses the tip 1125 of the blade 2014, as evidenced by stretched ITM portion 211. In other examples (NOT SHOWN), the local stretching of the ITM 210 can be propagated to another part of the ITM 210 that is not proximate to the point at which the surface of the ITM 210 traverses the tip 1125 of the blade 2014.

The skilled practitioner will understand that the foregoing discussion referencing FIGS. 22A-D on the subject of the interaction of a single blade 2014 with the ITM 210, and the corresponding forces and potential stretching of the ITM 210, is equally applicable to the case wherein at a treatment station, a plurality of blades 1122 is mounted in a blade-rotation mechanism 1120 such has been discussed herein with reference to FIGS. 4-7.

Figure 23:
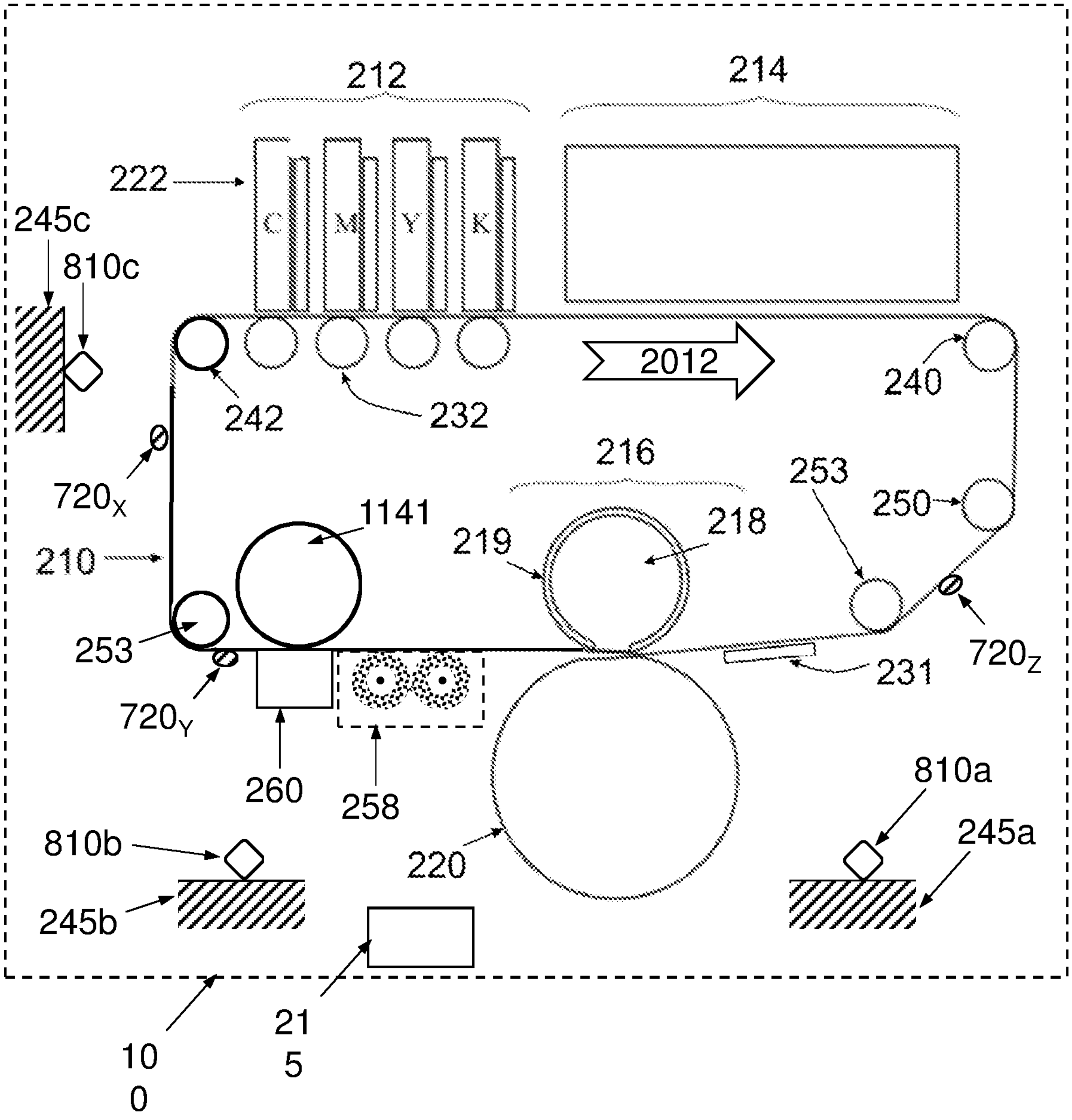
FIG. 23 is an elevation-view illustration of a printing system according to embodiments.

FIG. 23 shows a printing system 100 according to embodiments. The printing system 100 comprises an ITM 210, an image-forming station 212, an impression station 216, a conveyer (NOT SHOWN) that drives the rotation of the ITM 210 where the conveyer can be, for example, an electric motor, a treatment station 260 and a controller 215. The treatment station 260 can be, for example, any of the treatment stations shown in FIG. 2A or 2B, wherein the treatment station 260 is illustrated as comprising a single blade 2014, or the treatment station shown in FIG. 6, wherein coating thickness-regulation assembly 1120 comprises a plurality of blades 1122. The controller is configured to detect a non-uniform stretching of the ITM. This can be done, for example, by executing program instructions for calculating local velocities of the ITM 210 by timing the passage of markers 720 (shown in FIGS. 8-10) between fixed locators 810 (shown in FIG. 10) and noting deviations from predicted or standard passage times for each respective pair of location detectors 810, and especially pairs of such fixed locators that can be disposed upstream of the image-forming station 212 and even between respective print bars 222. The program instructions are preferably stored in a non-transitory storage medium (NOT SHOWN) of a controller 215. The controller also preferably comprises at least one computer processor configured to execute the program instructions. The controller 215 can be provided solely for carrying out some or all of the embodiments disclosed herein, or can be a controller that also performs other functions related to the operation of the printing system 100. Although not shown, the controller can obviously be connected wiredly or wirelessly to other components of the printing system 100 and/or to any other computing devices and/or computer networks or network components, and the foregoing can also include, inter alia, user interfaces such as displays and printers, and storage media.

The controller 215 can be additionally configured to respond to the detection of a non-uniform stretching of an ITM 210, by modulating a timing of the droplet deposition by the various print bars 222 so as to compensate for the non-uniform stretching. The modulating of the timing of the droplet deposition can be directed to avoid a mis-registration of ink droplets and avoid having the image-forming station 212 form a distorted ink image, or an image in which the various ink colors such as cyan, magenta, yellow and black (in a 4-color printing system, for example) do not line up properly to form an ink image as intended. Modulating the timing can include making the deposition of some ink droplets earlier or later than would otherwise have occurred. In some cases, modulating can include accelerating (making earlier) the deposition of some ink droplets of an image and decelerating (making later) the deposition of other ink droplets in the same image.

Suitable examples of methods for detecting non-uniform stretching of an ITM, and for responding to detecting non-uniform stretching of an ITM, include embodiments disclosed in US 2015/0042736 which is incorporated herein by reference in its entirety.

In some embodiments, the non-uniform stretching detected by the controller 215 is caused by the interaction between a blade 2014 or 1122, and the ITM 210. The nature of this interaction was discussed above with reference to FIGS. 22A-D. By design, the ITM runs continuously over a blade during normal operation of the printing system, and the ITM is preferably designed so as to not undergo non-uniform stretching as a result of the normal interaction with a blade. However, unexpected events, such as having a misaligned or mispositioned blade can lead to unusual or non-uniform stretching. For example, when a coating thickness-regulation assembly comprises a plurality of blades, it can happen that one specific blade out of the plurality of blades is misaligned or mispositioned within the coating thickness-regulation assembly and causes non-uniform stretching of the ITM only while the respective misaligned or mispositioned blade is in the active position for removing excess liquid from surface of the ITM; in such an example the misalignment problem would not cause non-uniform stretching of the ITM when other blades are in the active position. In such a case, the controller can detect and track multiple, repeated and/or periodic non-uniform stretchings, and report them to a user or operator of the printing system or to a file that can serve as a maintenance log. In addition to responding by modulating the timing of the deposition of ink droplets each time a non-uniform stretching is detected, an action can be taken in response to the detection of the multiple, repeated and/or periodic non-uniform stretchings. A suitable response can be re-aligning or otherwise adjusting a specific blade causing the repeated non-uniform stretching. In some embodiments, the adjustments can be done automatically by a controller together with the coating thickness-regulation assembly if the latter device is so configured, and in other embodiments an operator of the printing system can perform this function.

In some embodiments, the non-uniform stretching detected by the controller 215 can be caused by the additional stress of a blade-replacement operation. The details of blade-replacement operations have already been disclosed above, including the fact that they can cause stretching of an ITM 210, because a blade-replacement operation causes additional forces to be applied to the portion of the ITM 210 passing the treatment station when a blade-replacement operation occurs.

Figure 24:
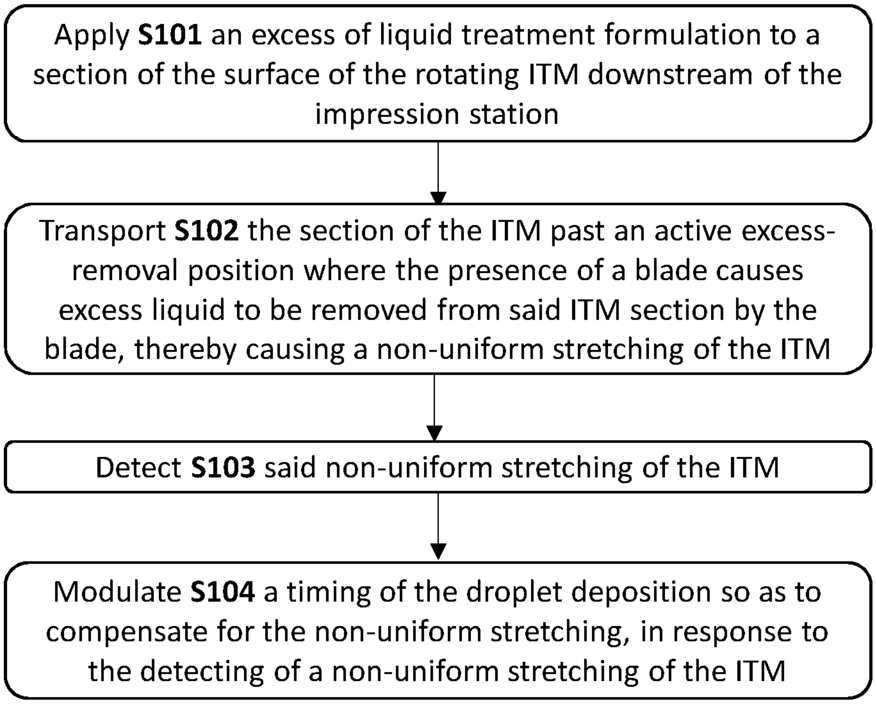
FIG. 24 is a flowchart of a method of operating a printing system that includes an applicator of liquid treatment formulation and a coating thickness-regulation assembly comprising a blade according to embodiments.

FIG. 24 contains a flowchart of a method, according to some embodiments, for operating a printing system in accordance with embodiments disclosed herein, the printing system including, at a treatment station downstream from an impression station and upstream from an image-forming station, an applicator of liquid treatment formulation and a coating thickness-regulation assembly comprising a blade. The method comprises:

a) Step S101 applying an excess of liquid treatment formula to a section of the ITM surface.
b) Step S102 transporting the section of the ITM (which has an excess of liquid treatment formulation from Step S101) past an excess-removal location where the presence of a blade causes excess liquid to be removed from said ITM section by the blade, thereby causing a non-uniform stretching of the ITM.
c) Step S103 detecting said non-uniform stretching of the ITM.
d) Step S104 modulating a timing of the droplet deposition so as to compensate for the non-uniform stretching, in response to the detecting of the non-uniform stretching of the ITM.

In some embodiments, the coating thickness-regulation assembly additionally comprises one or more additional blades, resulting in the coating thickness-regulation assembly comprising a plurality of blades, and the blade in Step S102 is one of the plurality of blades. In some embodiments, the non-uniform stretching is local and is within or proximate to the portion of the ITM traversing the treatment station. In some embodiments, not all steps of the method are necessary.

Figure 25:
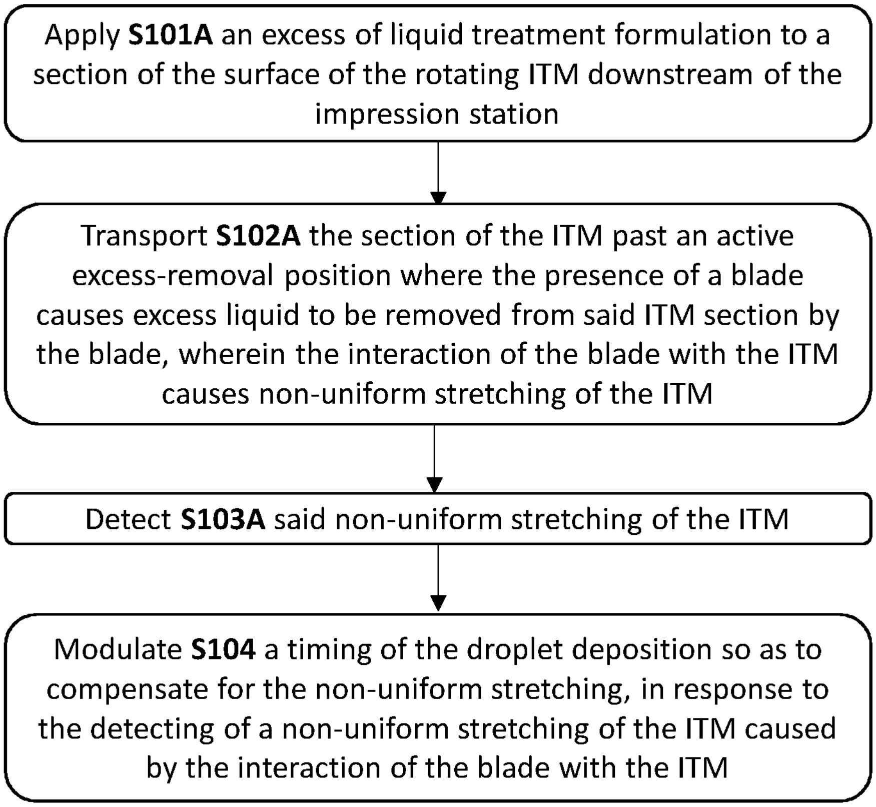
FIG. 25 is a flowchart of another method of operating a printing system that includes an applicator of liquid treatment formulation and a coating thickness-regulation assembly comprising a blade according to embodiments.

FIG. 25 contains a flowchart of a method, according to some embodiments, for operating a printing system in accordance with embodiments disclosed herein, the printing system including, at a treatment station downstream from an impression station and upstream from an image-forming station, an applicator of liquid treatment formulation and a coating thickness-regulation assembly comprising a blade. The method comprises:

a) Step S101A applying an excess of liquid treatment formula to a section of the ITM surface. This preferably occurs at a treatment station downstream from the impression station and upstream from the image-forming station.
b) Step S102A transporting the section of the ITM (which has an excess of liquid treatment formulation from Step S101A) past an excess-removal location where the presence of a blade causes excess liquid to be removed by interaction between the blade and the ITM, wherein the interaction of the blade with the ITM causes non-uniform stretching of the ITM.
c) Step S103A detecting said non-uniform stretching of the ITM
d) Step S104A modulating a timing of the droplet deposition so as to compensate for the non-uniform stretching, in response to a detection of a non-uniform stretching of the ITM caused by the interaction of the blade with the ITM.

In some embodiments, the coating thickness-regulation assembly additionally comprises one or more additional blades, resulting in the coating thickness-regulation assembly comprising a plurality of blades, and the blade in Step S102A is one of the plurality of blades. In some embodiments, the non-uniform stretching is local and is within or proximate to the portion of the ITM traversing the treatment station. In some embodiments, not all steps of the method are necessary. In other embodiments, the local stretching of the ITM can be propagated to another part of the ITM that is not within or proximate to the portion of the ITM traversing the treatment station.

Figure 26:
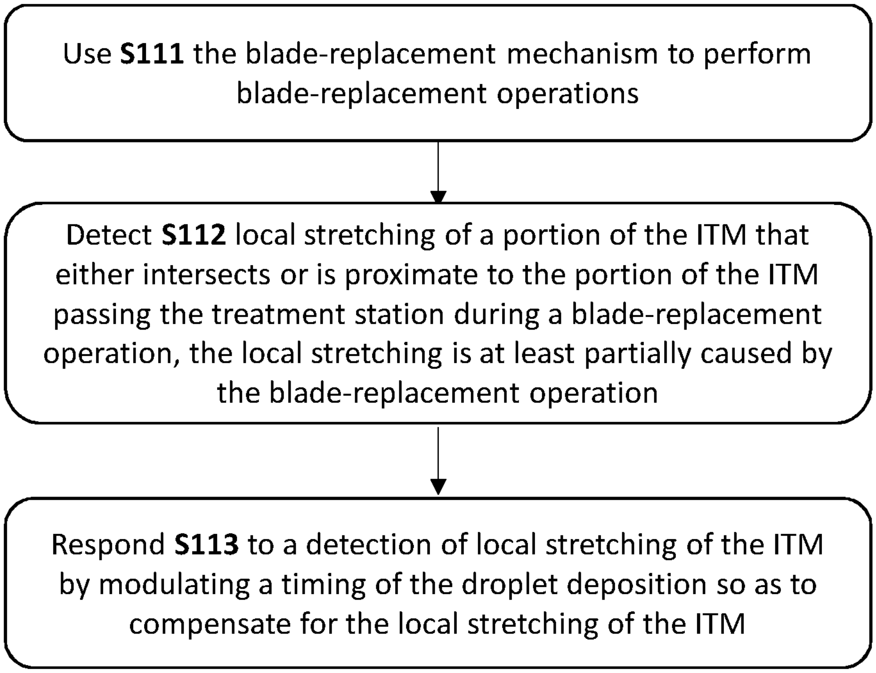
FIG. 26 is a flowchart of a method of operating a printing system that includes an applicator of liquid treatment formulation, a coating thickness-regulation assembly comprising a plurality of blades, and a blade-replacement mechanism according to embodiments.

FIG. 26 contains a flowchart of a method, according to some embodiments, of operating a printing system in accordance with any of the embodiments herein, the printing system including, at a treatment station downstream from an impression station and upstream from an image-forming station, an applicator of liquid treatment formulation, a coating thickness-regulation assembly comprising a plurality of blades, and a blade-replacement mechanism for performing blade-replacement operations so as to change which blade interacts with the ITM to remove excess liquid treatment formulation from the surface of the ITM. The method comprises:

a) Step S111 using the blade-replacement mechanism to perform blade-replacement operations.
b) Step S112 detecting local stretching of a portion of the ITM that either intersects or is proximate to the portion of the ITM passing the treatment station during a blade-replacement operation, wherein the local stretching is at least partially caused by the blade-replacement operation.
c) Step S113 responding to a detection of local stretching of the ITM by modulating a timing of the droplet deposition so as to compensate for the local stretching of the ITM.

In some embodiments, the modulating of Step S113 can be delayed by the travel time of the non-uniformly stretched section of the ITM between the treatment station and the image-forming station.

The present invention has been described using detailed descriptions of embodiments thereof that are provided by way of example and are not intended to limit the scope of the invention. The described embodiments comprise different features, not all of which are required in all embodiments of the invention. Some embodiments of the present invention utilize only some of the features or possible combinations of the features. Variations of embodiments of the present invention that are described and embodiments of the present invention comprising different combinations of features noted in the described embodiments will occur to persons skilled in the art to which the invention pertains.

In the description and claims of the present disclosure, each of the verbs, "comprise", "include" and "have", and conjugates thereof, are used to indicate that the object or objects of the verb are not necessarily a complete listing of members, components, elements or parts of the subject or subjects of the verb. As used herein, the singular form "a", "an" and "the" include plural references unless the context clearly dictates otherwise. For example, the term "a marking" or "at least one marking" may include a plurality of markings.

The invention claimed is:

1. A treatment-station for coating a surface of a flexible endless belt mounted over a plurality of guide rollers and driven by a conveyor, the flexible endless belt having first and second pluralities of pre-determined sections, the treatment station being configured for coating the belt surface with a layer of a liquid, the treatment station comprising:

a. an applicator for applying the liquid to the surface of the flexible endless belt;
b. a coating thickness-regulation assembly defining an excess-removal location, the coating thickness-regulation assembly comprising a plurality of blades and being configured so that for at least a part of the time each one of the blades is in an active position for removing excess liquid so as to leave only the desired layer of treatment formulation;

c. a blade-replacement mechanism, associated with the coating thickness-regulation assembly and configured for performing blade-replacement operations to replace a blade in the active position with another blade; and d. a blade-replacement controller for controlling the blade-replacement mechanism such that at least one of a first condition and a second condition are true, the first and second conditions being defined as follows:

A. according to the first condition, the blade-replacement controller controls the blade-replacement mechanism so as to ensure that the blade-replacement operations are performed only when one of the first plurality of pre-determined sections of the belt traverses the excess-removal location, and B. according to the second condition, the blade-replacement controller controls the blade-replacement mechanism so as to avoid performing blade-replacement operations when one of the second plurality of pre-determined sections of the belt traverses the excess-removal location.

2. The printing system of claim 1, wherein the blade-replacement controller controls the blade-replacement mechanism to perform the blade-replacement operations only when a pre-selected one of the first plurality of pre-determined sections of the belt traverses the excess-removal location.

3. The printing system of claim 1, wherein the blade-replacement controller controls the blade-replacement mechanism in accordance with a timing scheme.

4. The printing system of claim 1, additionally comprising a plurality of input devices configured to communicate with the blade-replacement controller, wherein the blade-replacement controller controls the blade-replacement mechanism according to ITM-panel position information communicated thereto from an input device.

5. The printing system of claim 1, wherein the first and second pluralities are mutually exclusive and together comprise all the sections of the belt.

6. The printing system of claim 1, wherein:

a. the coating thickness-regulation assembly comprises a blade-holder, the blades being radially extended therefrom, b. the blade-replacement mechanism comprises a motor, and c. the blade-replacement operation comprises rotating the coating-thickness-regulation assembly.

7. The printing system of claim 1, wherein the coating thickness-regulation assembly and the blade-replacement mechanism are configured so that:

a. at a first time before a blade-replacement operation, only a first blade is in the active position, b. at a second time during a blade-replacement operation, the first blade and a second blade are both in the active position, and c. at a third time after a blade-replacement operation, only the second blade is in the active position.

8. The printing system of claim 1, wherein the blade-replacement controller controls the blade-replacement to perform a blade-replacement operation exactly once during each rotation of the belt.

9. The printing system of claim 1, wherein the blade-replacement controller comprises a non-transitory computer-readable medium containing program instructions, wherein execution of the program instructions by one or more processors of a computer system causes the one or more processors to carry out at least one of:

a. causing the blade-replacement mechanism to perform a blade-replacement operation only when one of the first plurality of pre-determined sections of the belt traverses the excess-removal location, and b. causing the blade-replacement mechanism to avoid performing a blade-replacement operation when one of the second plurality of pre-determined sections of the belt traverses the excess-removal location.

10. A printing system comprising:

a. an intermediate transfer member (ITM) comprising a flexible endless belt;

b. an image forming station configured to form ink images by droplet deposition upon a surface of the ITM moving through the image forming station;

c. an impression station where the ink images are transferred to substrate from the ITM surface;

d. a conveyer for driving rotation of the ITM to transport the ink images towards the impression station;

e. a treatment station disposed downstream of the impression station and upstream of the image forming station configured for coating the ITM surface with a layer of a liquid treatment formulation, the treatment station comprising:

i. an applicator for applying the liquid treatment formulation to the surface of the ITM; and ii. a coating thickness-regulation assembly comprising a blade, the blade disposed so that a tip of the blade removes excess treatment formulation from the surface of the portion of the ITM traversing the treatment station to leave only the desired layer of treatment formulation; and f. a controller configured to detect a non-uniform stretching of the ITM associated with the traversal of the treatment station by the portion of the ITM and respond by performing at least one of the following:

A. modulating a timing of the droplet deposition so as to compensate for the non-uniform stretching;

B. adjusting the position of the blade; and

C. reporting that a blade-position adjustment is recommended.

11. The printing system of claim 10, wherein the non-uniform stretching is caused by the interaction of the blade with the surface of the ITM.

12. The printing system of claim 10, the coating thickness-regulation assembly additionally comprising at least one additional blade and being configured so that for at least a part of the time each one of the blades is in an active position to interact physically with the surface of the ITM so as to remove excess treatment formulation from the surface of the ITM.

13. A printing system comprising:

a. an intermediate transfer member (ITM) comprising a flexible endless belt;

b. an image-forming station configured to form ink images by droplet deposition upon a surface of the ITM moving through the image forming station;

c. an impression station where the ink images are transferred to substrate from the ITM surface;

d. a conveyer for driving rotation of the ITM to transport the ink images towards the impression station;

e. a treatment station disposed downstream of the impression station and upstream of the image-forming station configured for coating the ITM surface with a layer of a liquid treatment formulation, the treatment station comprising:

i. an applicator for applying the liquid treatment formulation to the ITM;

ii. a coating thickness-regulation assembly comprising a plurality of blades, the assembly configured so that for at least a part of the time each one of the blades is in an active position, so as to leave only the desired layer of treatment formulation on the surface of the ITM as it traverses the blade in the active position;

iii. a blade-replacement mechanism, associated with the coating thickness-regulation assembly and configured for performing blade-replacement operations to replace a blade in the active position with another blade, wherein a blade-replacement operation causes a local stretching of the ITM proximate to the portion of the ITM passing a blade in the active position; and f. a controller configured to detect said local stretching of the ITM and respond by modulating a timing of the droplet deposition so as to compensate for said local stretching of the ITM.

14. The system of claim 13, wherein the modulating is delayed by the travel time of the non-uniformly stretched section of the ITM between the treatment station and the image-forming station.

15. The system of claim 1 wherein at least the first condition is true.

16. The system of claim 1 wherein at least the second condition is true.

17. The system of claim 10 wherein the control is configured to respond to the detected non-uniform stretching of the ITM associated with the traversal of the treatment station by the portion of the ITM at least by modulating a timing of the droplet deposition so as to compensate for the non-uniform stretching.

18. The system of claim 17 wherein the control is configured to respond to the detected non-uniform stretching of the ITM associated with the traversal of the treatment station by the portion of the ITM at least by adjusting the position of the blade.

19. The system of claim 10 wherein the control is configured to respond to the detected non-uniform stretching of the ITM associated with the traversal of the treatment station by the portion of the ITM at least by adjusting the position of the blade.

* * * * *